United States Patent
Hidai et al.

(10) Patent No.: US 11,754,022 B2
(45) Date of Patent: Sep. 12, 2023

(54) STRADDLED VEHICLE

(71) Applicant: YAMAHA HATSUDOKI KABUSHIKI KAISHA, Iwata (JP)

(72) Inventors: Atsuya Hidai, Shizuoka (JP); Hisatoshi Kinoshita, Shizuoka (JP); Kazuteru Iwamoto, Shizuoka (JP); Atsushi Hirano, Shizuoka (JP); Tatsuya Kasahara, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/828,004

(22) Filed: May 30, 2022

(65) Prior Publication Data

US 2022/0389886 A1    Dec. 8, 2022

(30) Foreign Application Priority Data

May 31, 2021 (JP) .................. 2021-091962

(51) Int. Cl.
| | |
|---|---|
| *F02M 25/08* | (2006.01) |
| *B62K 11/04* | (2006.01) |
| *B62J 9/00* | (2020.01) |
| *B62J 45/41* | (2020.01) |
| *B62J 35/00* | (2006.01) |

(52) U.S. Cl.
CPC ............. *F02M 25/08* (2013.01); *B62J 9/00* (2013.01); *B62J 35/00* (2013.01); *B62J 45/41* (2020.02); *B62K 11/04* (2013.01)

(58) Field of Classification Search
CPC ... F02M 25/08; B62J 9/00; B62J 35/00; B62J 45/41; B62J 9/14; B62J 37/00; B62J 40/10; B62K 11/04
See application file for complete search history.

(56) References Cited

U.S. PATENT DOCUMENTS

| | | | |
|---|---|---|---|
| 2006/0037584 A1 | 2/2006 | Imamura | |
| 2010/0252554 A1 | 10/2010 | Eguchi et al. | |
| 2013/0062135 A1 | 3/2013 | Saitoh | |
| 2014/0060955 A1* | 3/2014 | Kono | F02M 35/024 |
| | | | 180/291 |
| 2016/0009329 A1 | 1/2016 | Tsubone et al. | |
| 2016/0010599 A1 | 1/2016 | Tsubone et al. | |
| 2016/0245237 A1 | 8/2016 | Ono et al. | |
| 2018/0179992 A1 | 6/2018 | Morita et al. | |
| 2019/0329647 A1* | 10/2019 | Takata | F02M 25/0854 |
| 2019/0381880 A1 | 12/2019 | Kamiyama | |
| 2020/0018247 A1 | 1/2020 | Shinagawa et al. | |
| 2020/0102899 A1 | 4/2020 | Andrzejewski et al. | |

(Continued)

FOREIGN PATENT DOCUMENTS

WO    2020184226 A1    9/2020

*Primary Examiner* — Xiao En Mo
(74) *Attorney, Agent, or Firm* — Rabin & Berdo, P.C.

(57) ABSTRACT

A vehicle includes a frame, a seat, a storage box, an engine body at least partially overlapping with the seat when seen from above, an intake system component, a fuel system component, an evaporative emission system, a pressure sensor, and at least one of an electric vent valve or an electric suction pump. At least one of the pressure sensor, the vent valve, or the suction pump is supported by at least one of a frame, a storage box, an engine body, an intake system component, or a fuel system component.

4 Claims, 15 Drawing Sheets

(56) References Cited

U.S. PATENT DOCUMENTS

| | | |
|---|---|---|
| 2020/0317045 A1 | 10/2020 | Watanabe et al. |
| 2021/0003101 A1 | 1/2021 | Edwards et al. |
| 2021/0262418 A1* | 8/2021 | Kawanishi ......... F02M 25/0872 |

* cited by examiner

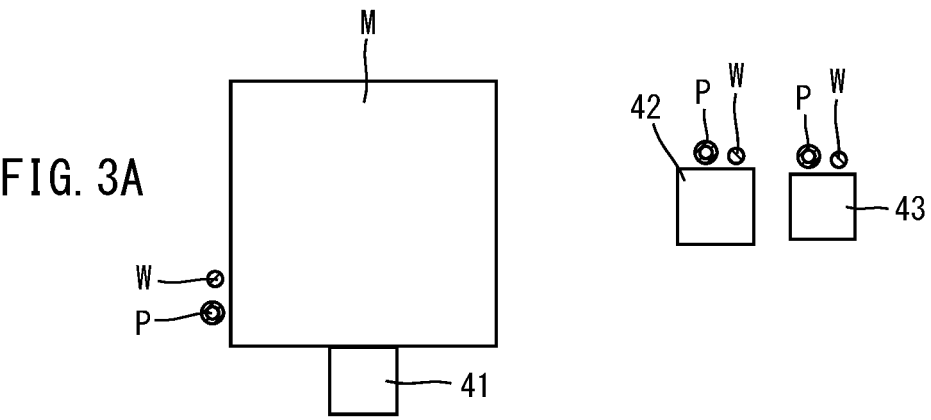
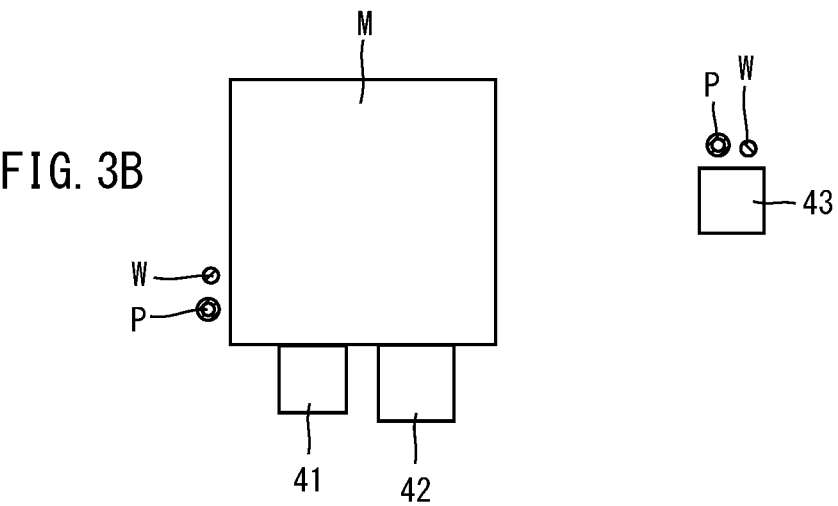
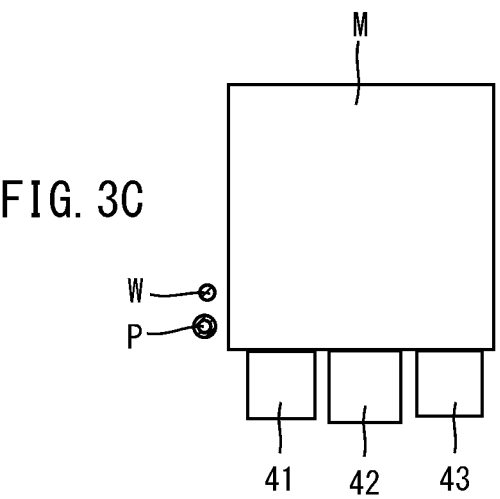

STRADDLED VEHICLE

TECHNICAL FIELD

The present teaching relates to a straddled vehicle.

BACKGROUND ART

A straddled vehicle using an engine as a power source, such as a motorcycle, includes an evaporative emission system for collecting a fuel evaporation gas in order to suppress emission, to the air, the fuel evaporation gas obtained by vaporization of fuel in a fuel tank. The evaporative emission system includes a canister connected to the fuel tank and an intake passage of the engine through a purge pipe. The evaporative emission system causes the fuel evaporation gas that has flowed from the fuel tank into the canister through the purge pipe to be adsorbed onto activated carbon in the canister. The evaporative emission system discharges the fuel evaporation gas onto which the activated carbon is adsorbed to the intake passage of the engine together with outside air introduced from an outside-air-introduction passage. The fuel evaporation gas discharged from the evaporative emission system into the intake passage of the engine is burnt by the engine.

A volume of the canister necessary for collecting the fuel evaporation gas using activated carbon is determined based on the amount of generation of a fuel evaporation gas calculated from, for example, the volume of the fuel tank and the area of a liquid level of fuel. Thus, the volume of the canister increases as the volume of the fuel tank and the area of the liquid level of fuel, for example, increase. On the other hand, in a straddled vehicle such as a motorcycle, a large number of components such as an engine and an auxiliary machine for the engine are mounted within a limited space. The canister is mounted in the limited space of the straddled vehicle together with other components while maintaining a volume sufficient for collecting fuel evaporation gas.

Patent Document 1, for example, discloses a straddled vehicle in which a canister is disposed between a body frame and an engine and located above a fuel pump. The canister is fixed to the body frame through a support member shared by the fuel pump. In the straddled vehicle of Patent Document 1, the canister and the fuel pump are vertically disposed near the engine so that components for the fuel system can be arranged in a compact space.

CITATION LIST

Patent Document

Patent Document 1: WO2020/184226

SUMMARY OF INVENTION

Technical Problem

An evaporative emission system needs to be air-tight in order to prevent leakage of fuel evaporation gas to the outside. In view of this, it is required in the straddled vehicle to regularly conduct a leak test for determining whether the evaporative emission system is air-tight enough to prevent leakage of a fuel evaporation gas to the outside. Air tightness of the evaporative emission system is determined based on a pressure in a gas passage of the evaporative emission system when a gas in the air passage is sucked with an outside-air-introduction passage closed.

The straddled vehicle includes an electric vent valve for blocking the outside-air-introduction passage, a pressure sensor for measuring a pressure in a gas passage through which a gas passes in the evaporative emission system, and an electric suction pump for sucking the gas in the gas passage, in order to perform a leak test of the evaporative emission system. Electric wires for supplying electric power are connected to these components, and the gas passage is also connected to the components.

In the straddled vehicle, various components are arranged within a limited space. Thus, it is required to arrange the components within the limited space of the straddled vehicle in order to easily avoid interference of electric wires and the gas passage connected to the components with other components.

It is therefore an object of the present teaching to provide a straddled vehicle in which components for a leak test of an evaporative emission system are arranged to easily avoid interference with electric wires and a gas passage connected to these components with other components.

Solution to Problem

Inventors of the present teaching have studied a straddled vehicle in which components for a leak test of an evaporative emission system are arranged to easily avoid interference of electric wires and a gas passage connected to these components with other components. Through an intensive study, the inventors arrived at the following configuration.

A straddled vehicle according to one embodiment of the present teaching is a straddled vehicle including: a frame; a seat directly or indirectly supported by the frame; a storage box directly or indirectly supported by the frame; an engine body constituting at least a part of an engine, at least a part of the engine body overlapping with the seat when seen from above; an intake system component constituting an intake system, the intake system being configured to take air into the engine; a fuel system component constituting a fuel system including a fuel tank, the fuel tank being configured to store fuel to be supplied to the engine; an evaporative emission system configured to collect a fuel evaporation gas generated in the fuel tank by using a canister, to introduce outside air into the canister from an outside-air-introduction passage for introducing outside air, and to discharge the collected fuel evaporation gas and the introduced outside air from the canister into an intake passage of the engine. This straddled vehicle includes a pressure sensor configured to measure a pressure in a gas passage in the evaporative emission system, the gas passage including the outside-air-introduction passage and a gas including at least one of the fuel evaporation gas or the outside air flowing in the gas passage; and at least one of an electric vent valve or an electric suction pump, the electric vent valve being configured to switch between a closed state in which the outside-air-introduction passage is closed and an open state in which the outside-air-introduction passage is open, the electric suction pump being configured to suck a gas in the gas passage. At least one of the pressure sensor, the vent valve, or the suction pump is supported by at least one of the frame, the storage box, the engine body, the intake system component, or the fuel system component.

In general, a frame, a storage box, an engine body, an intake system component, and a fuel system component of a straddled vehicle are closely arranged within a limited space under a seat. With the configuration described above, in such a space, at least one of the pressure sensor, the vent valve, or the suction pump for detecting leakage of a gas in the evaporative emission system is supported by at least one of the frame, the storage box, the engine body, the intake system component, or the fuel system component.

Components included in each of the frame, the storage box, the engine body, the intake system component, or the fuel system component have common characteristics of, such as a larger volume than those of the other components, a larger surface area than those of the other components, a shape elongated in at least one of the top-bottom direction, the left-right direction, or the front-rear direction, obtaining support stiffness to the vehicle body, and including or supporting an electric component to which the electric wire is connected. With the configuration described above, at least one of the pressure sensor, the vent valve, or the suction pump can be disposed with respect to at least one of the frame, the storage box, the engine body, the intake system component, or the fuel system component, by using the common characteristics as described above.

That is, in the configuration described above, at least one of the pressure sensor, the vent valve, or the suction pump is supported by at least one of the frame, the storage box, the engine body, the intake system component, or the fuel system component obtaining support stiffness to the vehicle body as described above. Accordingly, it is possible to avoid interference of the electric wire and the gas passage connected to at least one of the pressure sensor, the vent valve, or the suction pump with other components, while obtaining support stiffness of the at least one of the pressure sensor, the vent valve, or the suction pump.

Thus, with the configuration described above, it is possible to obtain the straddled vehicle in which components for a leak test of a gas in the evaporative emission system are arranged to easily avoid interference of the electric wire and the gas passage connected to the components with other components.

In another aspect, the straddled vehicle according to the present teaching preferably has the following configuration. At least one of the pressure sensor, the vent valve, or the suction pump is either disposed in an internal space of at least one of the frame, the storage box, the engine body, the intake system component, or the fuel system component, or disposed along an outer surface of at least one of the frame, the storage box, the engine body, the intake system component, or the fuel system component.

With the configuration described above, at least one of the pressure sensor, vent valve, or the suction pump for detecting leakage of a gas in the evaporative emission system can be disposed with respect to at least one of the frame, the storage box, the engine body, the intake system component, or the fuel system component, by using the common characteristics as described above.

Accordingly, the electric wire connected to at least one of the pressure sensor, the vent valve, or the suction pump can be shared by an electric wire disposed near at least one of the frame, the storage box, the engine body, the intake system component, or the fuel system component or can be constituted by an electric wire branched off from the electric wire.

The gas passage connected to at least one of the pressure sensor, the vent valve, or the suction pump can be disposed along the outer surface of at least one of the frame, the storage box, the engine body, the intake system component, or the fuel system component.

Thus, with the configuration described above, it is possible to obtain the straddled vehicle in which components for a leak test of a gas in the evaporative emission system are arranged to easily avoid interference of the electric wire and the gas passage connected to the components with other components.

In another aspect, the straddled vehicle according to the present teaching preferably has the following configuration. At least one of the pressure sensor, the vent valve, or the suction pump is either connected to at least one of the frame, the storage box, the engine body, the intake system component, or the fuel system component through a connection member, or connected to at least one of the frame, the storage box, the engine body, the intake system component, or the fuel system component while being in contact with the at least one of the frame, the storage box, the engine body, the intake system component, or the fuel system component.

With the configuration described above, at least one of the pressure sensor, the vent valve, or the suction pump can be supported by at least one of the frame, the storage box, the engine body, the intake system component, or the fuel system component.

Thus, with the configuration described above, it is possible to obtain the straddled vehicle in which components for a leak test of a gas in the evaporative emission system are arranged to easily avoid interference of the electric wire and the gas passage connected to the components with other components.

In another aspect, the straddled vehicle according to the present teaching preferably has the following configuration. At least one of the pressure sensor, the vent valve, or the suction pump is disposed in a recess constituted by an outer surface of at least one of the frame, the storage box, the engine body, the intake system component, or the fuel system component.

With the configuration described above, at least one of the pressure sensor, the vent valve, or the suction pump can be arranged in a compact space with respect to at least one of the frame, the storage box, the engine body, the intake system component, or the fuel system component.

Thus, with the configuration described above, it is possible to obtain the straddled vehicle in which components for a leak test of a gas in the evaporative emission system are arranged to easily avoid interference of the electric wire and the gas passage connected to the components with other components.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, operations, elements, components, and/or their equivalents but do not preclude the presence or addition of one or more other features, steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include electrical connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

An embodiment of a straddled vehicle according to the present teaching will be herein described.

In the following description, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Straddled Vehicle]

A straddled vehicle herein is a vehicle in which a passenger is seated on a seat while being astride the seat. Thus, the straddled vehicle includes vehicles such as a three-wheeled vehicle and a four-wheeled vehicle in addition to a two-wheeled vehicle as long as a passenger is seated on a seat while being astride a seat. The straddled vehicle includes a scooter.

[Fuel Evaporation Gas]

A fuel evaporation gas herein refers to a gas obtained by vaporization of hydrocarbon fuel such as gasoline or gas oil serving as fuel of the straddled vehicle under the influence of, for example, temperature and atmospheric pressure.

[Gas Passage]

A gas passage herein refers to a space in which a fuel evaporation gas passes in an evaporative emission system. In the gas passage, activated carbon for capturing a fuel evaporation gas is disposed.

[Frame]

A frame herein includes not only a main frame but also a member supporting a component of a straddled vehicle. Examples of the frame include members having support stiffness such as the main frame, a seat rail, a rear frame, and a head pipe.

[Storage Box]

A storage box herein refers to a member capable of accommodating articles such as a helmet and baggage. Examples of the storage box include an under-seat box located under a seat, a helmet box for accommodating a helmet, and a baggage-storage box for accommodating baggage.

[Engine Body]

An engine body herein includes not only an engine but also a transmission connected to the engine, and a component such as an auxiliary machine supported by the engine, for example.

[Intake System Component]

An intake system component herein is a component constituting an intake system of the engine. Examples of the intake system component include an intake duct, an air cleaner, a joint, a throttle body, and an intake manifold.

[Fuel System Component]

A fuel system component herein is a component constituting a fuel system that supplies fuel to an engine. Examples of the fuel system component include a fuel tank, a fuel pump, a fuel pipe, and an injection.

[Internal Space]

An internal space herein refers to a space located in and surrounded by at least one of a frame, a storage box, an engine body, an intake system component, or a fuel system component. A part of the internal space may be connected to the outside of a component constituting the internal space. That is, the internal space may not be a space within a closed cross section.

[Support]

A support herein refers to a state where a member is directly or indirectly supported by a supporting body. The state where the member is directly supported by the supporting body refers to a state where the member is directly connected to and supported by the supporting body. The state where the member is indirectly supported by the supporting body refers to a state where the member is connected to the supporting body through another member (e.g., attachment member) and supported by the supporting body.

The term "support" includes a state where the member is directly or indirectly supported by the supporting body in an internal space or a recess of the supporting body. The support also includes a state where the member is directly or indirectly supported by an outer surface of the supporting body.

Examples of the member includes at least one of a pressure sensor, a vent valve, or a suction pump. Examples of the supporting body include at least one of a frame, a storage box, an engine body, an intake system component, or a fuel system component.

[Arrange Along Outer Surface of at Least One of Frame, Storage Box, Engine Body, Intake System Component, or Fuel System Component]

The expression "arrange a component along an outer surface of at least one of a frame, a storage box, an engine body, an intake system component, or a fuel system component" refers to a case where a minimum distance between the outer surface and the component is smaller than a maximum dimension of the component. In the case of arranging the component along the outer surface, the component may be separated from at least a part of the outer surface or the component may be in contact with the outer surface. The component may be parallel to the outer surface or may not be parallel to the outer surface. The case of arranging the component along the outer surface includes a case where the component is disposed in a recess of at least one of the frame, the storage box, the engine body, the intake system component, or the fuel system component

[Another Component]

Another component herein refers to a component except for a component for a leak test of a gas in an evaporative emission system among components constituting a straddled vehicle.

Advantageous Effects of Invention

One embodiment of the present teaching can provide a straddled vehicle in which a component for a leak test of a gas in an evaporative emission system is disposed in order to easily avoid interference of electric wires and a gas passage connected to the component with another component.

BRIEF DESCRIPTION OF DRAWINGS

FIG. 3A is a view schematically illustrating an example of a state where at least one of a vent valve, a suction pump, or a pressure sensor is directly supported by at least one of a frame, a storage box, an engine body, an intake system component, or a fuel system component.

FIG. 3B is a view schematically illustrating an example of the state where at least one of the vent valve, the suction pump, or the pressure sensor is directly supported by at least one of the frame, the storage box, the engine body, the intake system component, or the fuel system component.

FIG. 3C is a view schematically illustrating an example of the state where at least one of the vent valve, the suction pump, or the pressure sensor is directly supported by at least one of the frame, the storage box, the engine body, the intake system component, or the fuel system component.

DESCRIPTION OF EMBODIMENT

Figure 1:
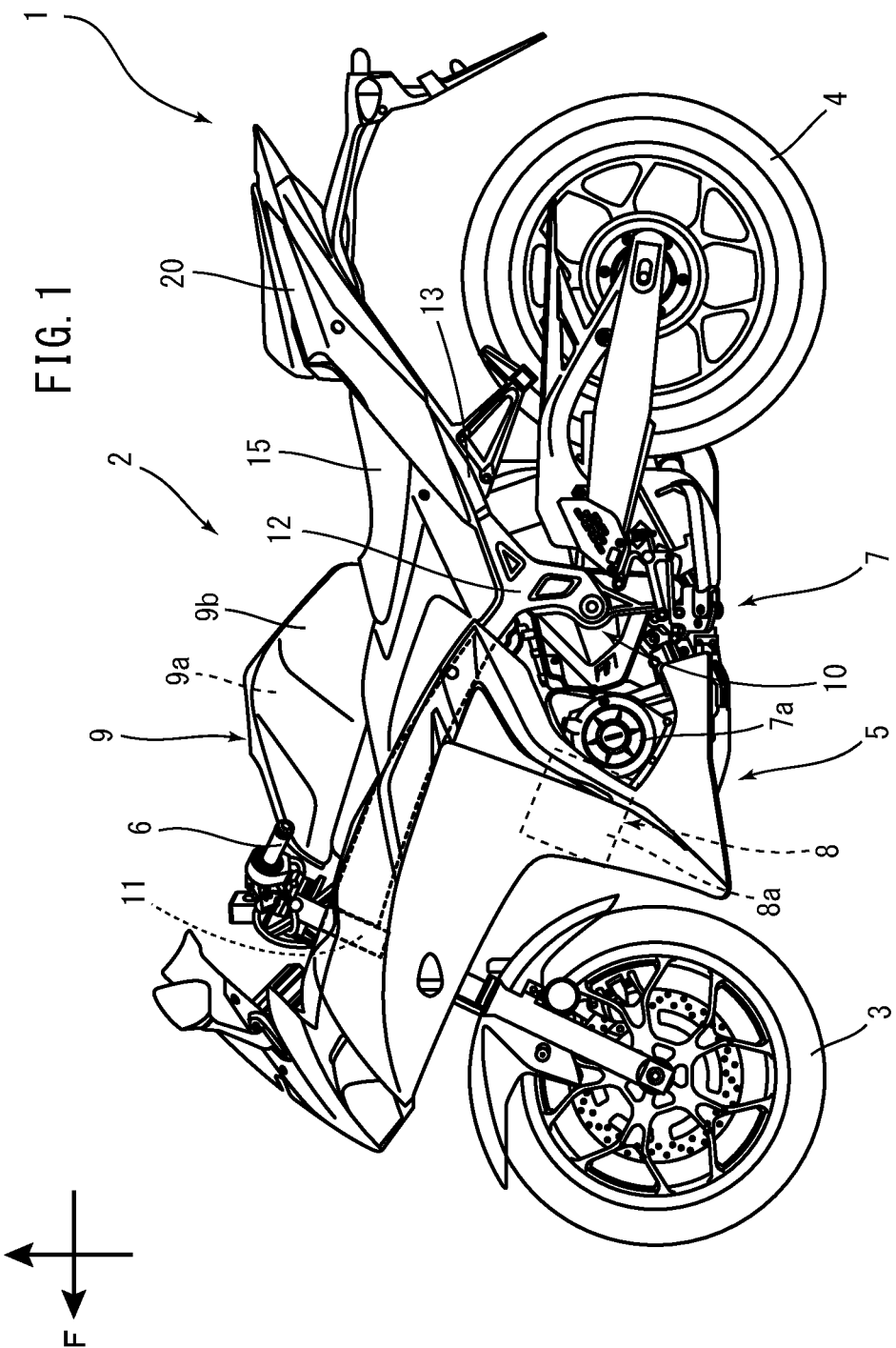
FIG. 1 is a left side view schematically illustrating an entire configuration of a vehicle according to a first embodiment of the present teaching.

An embodiment of the present teaching will be described in detail with reference to the drawings. In the drawings, the same or corresponding parts are denoted by the same reference numerals, and description thereof will not be repeated. The dimensions of components in the drawings do not strictly represent actual dimensions of the components and dimensional proportions of the components.

In the following description, arrow F in the drawings represents a forward direction of a vehicle. Arrow U in the drawings represents an upward direction of the vehicle. The top-bottom direction, the left-right direction, and the front-rear direction herein respectively refer to the top-bottom direction, the left-right direction, and the front-rear direction when seen from a passenger of the vehicle.

First Embodiment

<Overall Configuration of Vehicle>

With reference to FIG. 1, a vehicle 1 as a straddled vehicle according to a first embodiment of the present teaching will be described. FIG. 1 is a side view schematically illustrating an overall configuration of the vehicle 1 (straddled vehicle) according to the first embodiment. The vehicle 1 is, for example, a motorcycle, and includes a vehicle body 2, a front wheel 3, and a rear wheel 4. The vehicle 1 turns in a leaning posture. Specifically, the vehicle 1 leans leftward when turning to the left and leans rightward when turning to the right. The vehicle 1 includes a storage box 20 in a rear portion. The vehicle 1 may not include the storage box 20.

The vehicle body 2 supports each of components such as a vehicle body cover 5, a bar handle 6, the storage box 20, a power unit 7, an intake system 8, and a fuel system 9. In this embodiment, the vehicle body 2 includes a frame 10 and supports components of the vehicle 1.

The frame 10 includes a head pipe 11, a main frame 12, and a seat rail 13.

The head pipe 11 is located in a front portion of the vehicle 1 and rotatably supports an unillustrated steering shaft connected to the bar handle 6.

A front portion of the main frame 12 is connected to the head pipe 11 and extends rearward in the vehicle. A rear portion of the main frame 12 extends rearward and downward in the vehicle. The main frame 12 supports, for example, the power unit 7.

A fuel tank 9b is fixed to an upper portion of the main frame 12. In the left-right direction of the vehicle 1, the vehicle body cover 5 is partially fixed to at least a part of the surface of the main frame 12. That is, a part of the main frame 12 located under the fuel tank 9b is covered with a part of the vehicle body cover 5. In this embodiment, a lower end portion and a rear end portion of the main frame 12 are not covered with the vehicle body cover 5 and other members, and are exposed. That is, at least a part of the main frame 12 constitutes an outer surface of the vehicle 1 in the left-right direction. The main frame 12 may be covered with, for example, the vehicle body cover 5.

As illustrated in FIG. 1, the seat rail 13 is connected to a rear end portion of the main frame 12. That is, the seat rail 13 extends from the rear end portion of the main frame 12 toward the rear of the vehicle 1. A seat 15 on which a passenger is seated is disposed at the center of the vehicle 1 in the left-right direction above the seat rail 13. The vehicle body cover 5 is partially fixed to at least a part of the surface of the seat rail 13. That is, at least a part of the seat rail 13 is covered with the vehicle body cover 5. The seat 15 is disposed in the vehicle 1 to overlap with at least a part of the main frame 12 and the seat rail 13 when seen from above.

The power unit 7 includes an engine body 7a. Although not specifically shown, the engine body 7a includes an engine, an engine auxiliary machine, and a transmission. The engine is supplied with fuel from the fuel tank 9b. The engine auxiliary machine is a device for driving the engine and includes, for example, a fuel vaporization device, an ignition device, and a starting device. The transmission is rotatably connected to a crankshaft of the engine. Configurations of the engine, the engine auxiliary machine, and the transmission are the same as conventional configurations, and thus, will not be described specifically.

In the vehicle 1, the power unit 7 is disposed such that at least a part of the power unit 7 overlaps with the seat 15 when seen from above. Specifically, in the vehicle 1, the engine body 7a of the power unit 7 is disposed such that at least a part of the engine body 7a overlaps with the seat 15 when seen from above.

The intake system 8 includes an intake system component for introducing outside air to the engine. Specifically, the intake system 8 includes, for example, an air intake, an air cleaner, an intake duct, a joint, a throttle body, and an intake manifold. Each component constituting the intake system 8 is an intake system component 8a. The intake system component 8a is not limited to the examples described above as long as the intake system component 8a constitutes the intake system 8.

The air intake constitutes an outside air introduction path for introducing outside air into the vehicle 1. The air cleaner removes, for example, foreign substance in the outside air taken by the air intake. The intake duct is a duct for supplying outside air to the manifold. The throttle body is a valve for adjusting an air volume to be supplied to the engine. The intake manifold is a member for supplying air that has passed through the air cleaner, to cylinders of the engine. Configurations of the air intake, the air cleaner, the intake duct, the joint, the throttle body, and the intake manifold are the same as conventional configurations, and thus, will not be described specifically.

The fuel system 9 includes a fuel system component for supplying fuel to the engine. Specifically, the fuel system 9 includes, for example, the fuel tank 9b, a fuel pump, a fuel pipe, and an injection. Each component constituting the fuel system 9 is a fuel system component 9a. The fuel system component 9a is not limited to the example described above as long as the fuel system component 9a constitutes the fuel system 9.

The fuel tank 9b is a tank for storing fuel to be supplied to the engine. The fuel pump is a pump for supplying fuel stored in the fuel tank 9b to the injection through the fuel pipe. The fuel pipe is a pipe constituting a supply path for supplying fuel from the fuel tank 9b to the injection. The injection discharges fuel supplied from the fuel pipe to intake air for the engine. Configurations of the fuel tank 9b, the fuel pump, the fuel pipe, and the injection are the same as conventional configurations, and thus, will not be described specifically.

The intake system component 8a and the fuel system component 9a described above are disposed near the engine body 7a. Thus, the intake system component 8a and the fuel system component 9a are closely disposed within a limited space below the seat 15, together with the engine body 7a and the main frame 12 supporting the engine body 7a.

The storage box 20 is disposed near the seat 15. The storage box 20 may be disposed below the seat 15 or may be disposed forward or rearward of the seat 15, for example. The storage box 20 may be configured to house a helmet therein or to house baggage or the like.

<Overall Configuration of Evaporative Emission System>

Figure 2:
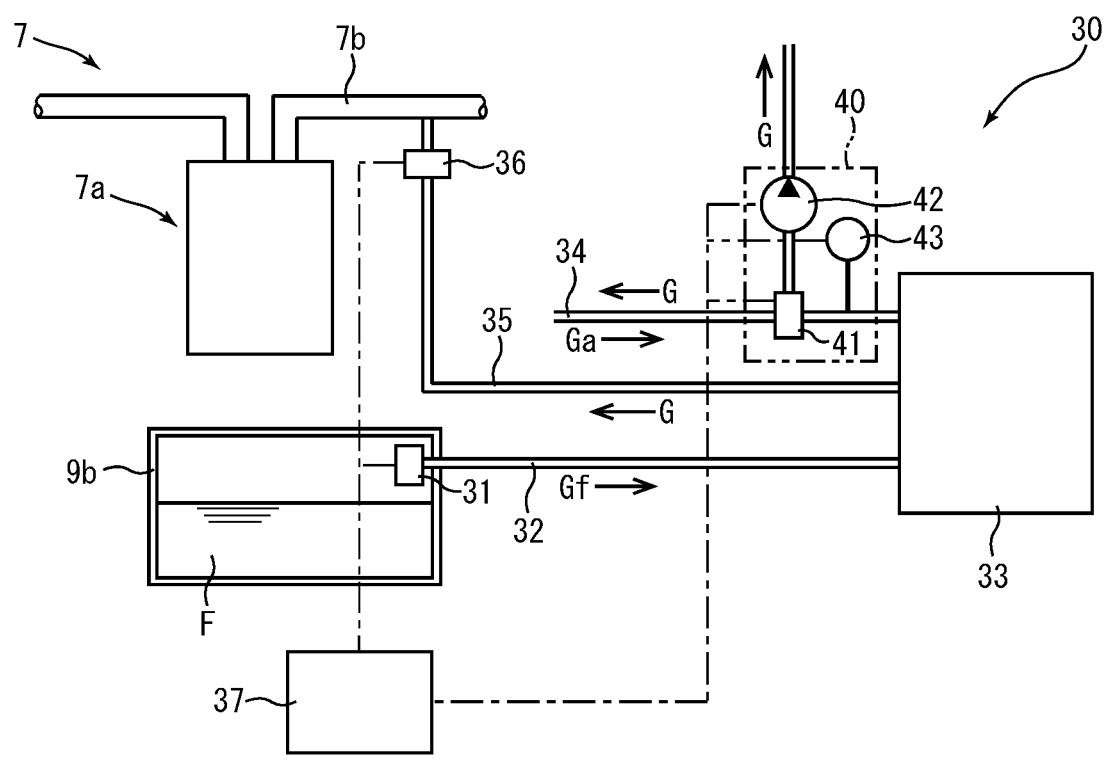
FIG. 2 is a schematic configuration view of an evaporative emission system mounted on the vehicle according to the first embodiment of the present teaching.

Next, with reference to FIG. 2, an evaporative emission system 30 mounted on the vehicle 1 according to the present teaching will be described. FIG. 2 is a schematic configuration view of an evaporative emission system 30 mounted on the vehicle 1 according to the first embodiment.

As illustrated in FIG. 2, the evaporative emission system 30 is a system that suppresses emission, into the air, of a fuel evaporation gas Gf obtained by vaporization of fuel F in the fuel tank 9b. The evaporative emission system 30 includes a shut-off valve 31, a first purge pipe 32, a canister 33, a vent pipe 34, a second purge pipe 35, a purge control valve 36, and a control device 37. The evaporative emission system 30 also includes a leak detection device 40 described later.

In the evaporative emission system 30, the shut-off valve 31 is a switching valve that switches a gas passage in which a gas G including at least one of a fuel evaporation gas Gf or outside air Ga flows between a closed state in which the gas passage is closed and an open state in which the gas passage is open. The shut-off valve 31 is, for example, an electromagnetic solenoid valve. The shut-off valve 31 is connected to the fuel tank 9b that stores fuel F to be supplied to the engine. In this embodiment, the shut-off valve 31 is located in the fuel tank 9b. One end of the first purge pipe 32 is connected to the shut-off valve 31 from outside of the fuel tank 9b.

The shut-off valve 31 switches between a closed state of closing one end of the first purge pipe 32 and an open state of opening one end of the first purge pipe 32. While the shut-off valve 31 is in the closed state, the fuel evaporation gas Gf in the fuel tank 9b does not flow into the first purge pipe 32. While the shut-off valve 31 is in the open state, the fuel evaporation gas Gf in the fuel tank 9b flows into the first purge pipe 32 through the inside of the shut-off valve 31. In the manner described above, the shut-off valve 31 in which the fuel evaporation gas Gf flows constitutes a part of the gas passage. The shut-off valve 31 may be located outside the fuel tank 9b. The shut-off valve 31 may be supported by a component other than the fuel tank 9b.

The first purge pipe 32 is a pipe through which the fuel evaporation gas Gf in the fuel tank 9b flows to the canister 33. The other end of the first purge pipe 32 is connected to the canister 33. That is, the first purge pipe 32 connects the shut-off valve 31 and the canister 33. The first purge pipe 32 is switched by the shut-off valve 31 between an open state in which the fuel evaporation gas Gf in the fuel tank 9b flows and a shut-off state in which the fuel evaporation gas Gf in the fuel tank 9b does not flow. The first purge pipe 32 in which the fuel evaporation gas Gf flows constitutes a part of the gas passage.

The canister 33 is a fuel-evaporation-gas-absorbing device that collects the fuel evaporation gas Gf and discharges the collected fuel evaporation gas Gf to an intake pipe 7b that is an intake passage of the engine together with outside air Ga. The canister 33 includes a casing and unillustrated activated carbon serving as an adsorbent that adsorbs the fuel evaporation gas Gf. Activated carbon is disposed in an internal space of the casing.

The other end of the first purge pipe 32 is connected to the canister 33. Accordingly, the fuel evaporation gas Gf in the fuel tank 9b flows into the canister 33 from the first purge pipe 32. The vent pipe 34 and the second purge pipe 35 are connected to the canister 33. The outside air Ga flows into the canister 33 from the vent pipe 34. In this manner, the internal space of the canister 33 in which the fuel evaporation gas Gf and the outside air Ga flow constitute a part of the gas passage.

The vent pipe 34 is a pipe through which the gas G in the canister 33 is discharged into the air and outside air Ga is introduced into the canister 33. One end of the vent pipe 34 is connected to the canister 33. The other end of the vent pipe 34 is open to the air. Accordingly, the vent pipe 34 enables the outside air Ga to be introduced into the canister 33 from the other end thereof. The vent pipe 34 enables the gas G after absorption of the full evaporation gas Gf by activated carbon in the canister 33 to be discharged to the air.

The vent pipe 34 in which the gas G after absorption of the full evaporation gas Gf flows constitutes a part of the gas passage.

The second purge pipe 35 is a pipe through which the gas G including the fuel evaporation gas Gf and the outside air Ga in the canister 33 flows to the intake pipe 7b of the engine. One end of the second purge pipe 35 is connected to the canister 33. The other end of the second purge pipe 35 is connected to the intake pipe 7b of the engine. Accordingly, the second purge pipe 35 can discharge the gas G in the canister 33 to the intake pipe 7b. The second purge pipe 35 in which the gas G flows constitutes a part of the gas passage. The purge control valve 36 is disposed in the second purge pipe 35.

The purge control valve 36 is a flow-rate-control valve capable of continuously changing an opening degree between a closed state in which the second purge pipe 35 is closed and an open state in which the second purge pipe 35 is open. The purge control valve 36 is, for example, an electromagnetic-proportional-control valve. The purge control valve 36 is disposed at an arbitrary position in the second purge pipe 35. The purge control valve 36 is connected to a component constituting the vehicle 1. The purge control valve 36 is connected to, for example, the frame 10.

The control device 37 controls the evaporative emission system 30. The control device 37 is, for example, an ECU for controlling driving of the engine. The control device 37 is electrically connected to the shut-off valve 31 and the purge control valve 36. The control device 37 stores various programs and data for controlling the shut-off valve 31, the purge control valve 36, and the leak detection device 40. The control device 37 controls the shut-off valve 31 such that the shut-off valve 31 switches between the closed state and the open state. The control device 37 performs control such that the opening degree of the purge control valve 36 continuously changes from the closed state to the open state. The control device 37 may be a member separated from the ECU.

<Purge Operation of Evaporative Emission System>

In the thus-configured evaporative emission system 30, while the engine is not operated, the control device 37 switches the shut-off valve 31 to the open state. In addition, the control device 37 switches the purge control valve 36 to the closed state. The fuel evaporation gas Gf generated in the fuel tank 9b flows into the canister 33 through the first purge pipe 32. The fuel evaporation gas Gf that has flowed into the canister 33 is adsorbed by activated carbon. The gas G after adsorption of the fuel evaporation gas Gf is discharged to the air from the vent pipe 34.

While the engine is operated, the control device 37 switches the shut-off valve 31 to the closed state. In addition, the control device 37 controls the opening degree of the purge control valve 36 depending on an operating state of the engine. The gas G in the gas passage of the evaporative emission system 30 is caused to flow toward the intake pipe 7b by a pressure decrease in the intake pipe 7b due to operation of the engine. Accordingly, the pressure in the gas passage becomes negative.

The evaporative emission system 30 introduces the outside air Ga into the canister 33 from the vent pipe 34 by using a negative pressure in the gas passage. The outside air Ga that has flowed into the canister 33 is mixed with the evaporation gas Gf adsorbed on activated carbon. The evaporative emission system 30 discharges a gas G as a mixture of the outside air Ga and the fuel evaporation gas Gf to the intake pipe 7b from the second purge pipe 35. In the evaporative emission system 30, since the fuel evaporation gas Gf adsorbed on activated carbon is removed by the outside air Ga, the capacity of the fuel evaporation gas Gf that can be collected by activated carbon increases.

<Configuration of Leak Detection Device>

Next, with reference to FIG. 2, the leak detection device 40 of the evaporative emission system 30 will be described. The leak detection device 40 is a device for detecting leakage of a gas from the evaporative emission system 30. The leak detection device 40 is a leak detection device of a forced-negative-pressure type that detects leakage of a gas from the gas passage with the pressure in the gas passage of the evaporative emission system 30 being forcibly made negative.

The leak detection device 40 includes a vent valve 41, a suction pump 42, and a pressure sensor 43 that are components for a leak test of a gas G from the evaporative emission system 30. In the leak detection device 40, the canister 33 may be integrated with the vent valve 41 and the suction pump 42, or may be separated from the vent valve 41 and the suction pump 42.

The vent valve 41 is an electric valve that switches between a closed state of closing the vent pipe 34 as an outside-air-introduction passage and an open state of opening the vent pipe 34. The vent valve 41 is, for example, an electromagnetic solenoid valve. The vent valve 41 is disposed at an arbitrary position in the vent pipe 34. A suction pump is connected to the vent valve 41. The vent valve 41 switches to a state in which the suction pump 42 can suck the gas G in the air passage, in the closed state of closing the vent pipe 34. In addition, the vent valve 41 switches to a state in which the suction pump 42 cannot suck the gas G in the gas passage, in the open state of opening the vent pipe 34.

While the vent valve 41 is in the open state, the evaporative emission system 30 discharges, to the air, the gas G not including the fuel evaporation gas Gf in the canister 33 from the vent pipe 34. On the other hand, while the vent valve 41 is in the open state, the evaporative emission system 30 introduces the outside air Ga from the vent pipe 34 to the canister 33. In this case, the suction pump 42 cannot suck the gas G in the gas passage.

While the vent valve 41 is in the closed state, the evaporative emission system 30 does not discharge the gas G in the canister 33 from the vent pipe 34 to the air. While the vent valve 41 is in the closed state, the evaporative emission system 30 does not introduce outside air Ga from the vent pipe 34 into the canister 33. In this case, the suction pump 42 is capable of sucking the gas G in the gas passage. The vent valve 41 is electrically connected to the control device 37. Accordingly, the control device 37 can control the vent valve 41.

The suction pump 42 is an electric pump that sucks the gas G in the gas passage. The suction pump 42 is, for example, a rotary pump. The suction pump 42 is disposed in, for example, the vent valve 41.

The suction pump 42 can suck the gas G in the gas passage while the vent valve 41 is in the closed state. That is, the suction pump 42 changes the pressure in the gas passage to negative. The suction pump 42 is electrically connected to the control device 37. Accordingly, the control device 37 can control the suction pump 42.

The pressure sensor 43 is a sensor for measuring a pressure in the gas passage. The pressure sensor 43 is disposed at one of an arbitrary location in the first purge pipe 32, a location closer to the canister 33 than the vent valve 41 in the vent pipe 34, a location in the canister 33, or a location closer to the canister 33 than the purge control valve 36 in the second purge pipe 35. The pressure sensor 43 measures a pressure in the gas passage. The pressure sensor 43 is electrically connected to the control device 37. Accordingly, the control device 37 can acquire measurement data from the pressure sensor 43.

<Leak Detection of Evaporative Emission System>

To detect leakage of a gas G from the evaporative emission system 30, the control device 37 switches the shut-off valve 31, the purge control valve 36, and the vent valve 41 to the closed state. Accordingly, in the evaporative emission system 30, the gas passage is hermetically sealed. Then, the control device 37 sucks the gas G in the gas passage by the suction pump 42. The control device 37 measures a pressure in the gas passage by the pressure sensor 43. If the measured value of the pressure sensor 43 is a reference value or more, the control device 37 determines that there is a possibility of leakage of the gas from the gas passage of the evaporative emission system 30.

<Arrangement of Leak Detection Device>

An example of arrangement of the leak detection device 40 with the configuration described above will now be described.

FIGS. 3A through 7C schematically illustrate an example of arrangement of the leak detection device 40 in the vehicle as the straddled vehicle according to the first embodiment.

In this embodiment, as illustrated in FIGS. 3A through 3C and FIGS. 4A through 4D, at least one of the vent valve 41, the suction pump 42, or the pressure sensor 43 in the leak detection device 40 is supported by at least one of the frame 10, the storage box 20, the engine body 7a, the intake system component 8a, or the fuel system component 9a.

The state where at least one of the vent valve 41, the suction pump 42, or the pressure sensor 43 is supported by at least one of the frame 10, the engine body 7a, the intake system component 8a, or the fuel system component 9a includes not only a case where at least one of the vent valve 41, the suction pump 42, or the pressure sensor 43 is directly supported by at least one of the frame 10, the storage box 20, the engine body 7a, the intake system component 8a, or the fuel system component 9a but also a case where at least one of the vent valve 41, the suction pump 42, or the pressure sensor 43 is indirectly supported through another member such as a support member.

The state where at least one of the vent valve 41, the suction pump 42, or the pressure sensor 43 is supported by at least one of the frame 10, the engine body 7a, the intake system component 8a, or the fuel system component 9a includes not only a case where at least one of the vent valve 41, the suction pump 42, or the pressure sensor 43 is supported by the outer surface of the at least one of the frame 10, the engine body 7a, the intake system component 8a, or the fuel system component 9a but also a case where the vent valve 41, the suction pump 42, or the pressure sensor 43 is supported by the at least one of the frame 10, the engine body 7a, the intake system component 8a, or the fuel system component 9a while being disposed in an internal space or a recess in this at least one member.

FIGS. 3A through 3C schematically illustrate an example of a state where at least one of the vent valve 41, the suction pump 42, or the pressure sensor 43 in the leak detection device 40 is directly supported by at least one of the frame 10, the storage box 20, the engine body 7a, the intake system component 8a, or the fuel system component 9a.

FIGS. 4A through 4D schematically illustrate an example of a state where at least one of the vent valve 41, the suction pump 42, or the pressure sensor 43 in the leak detection device 40 is indirectly supported by at least one of the frame 10, the storage box 20, the engine body 7a, the intake system component 8a, or the fuel system component 9a through a connection member X.

Figure 5A:
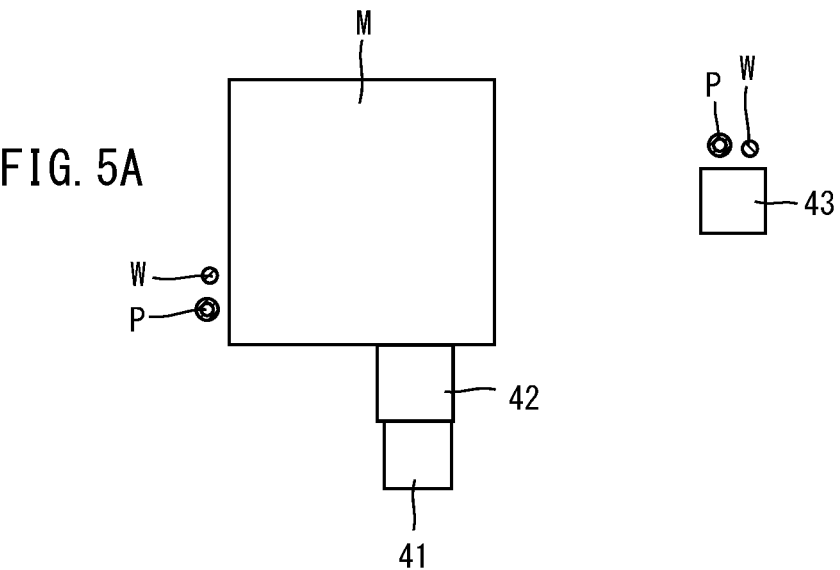
FIG. 5A is a view schematically illustrating an example of a state where at least one of the vent valve, the suction pump, or the pressure sensor is indirectly supported by at least one of the frame, the storage box, the engine body, the intake system component, or the fuel system component through another member of a leak detection device.
Figure 5B:
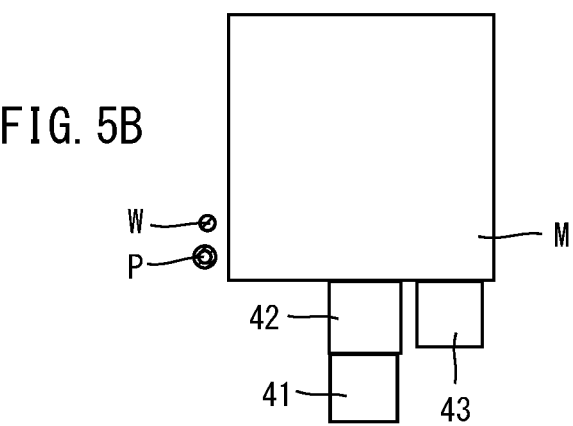
FIG. 5B is a view schematically illustrating an example of the state where at least one of the vent valve, the suction pump, or the pressure sensor is indirectly supported by at least one of the frame, the storage box, the engine body, the intake system component, or the fuel system component through another member of the leak detection device.
Figure 5C:
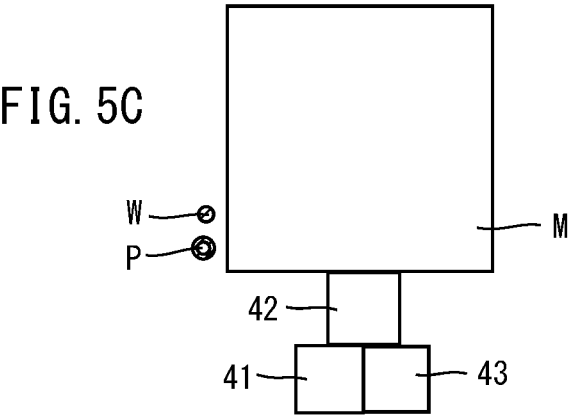
FIG. 5C is a view schematically illustrating an example of the state where at least one of the vent valve, the suction pump, or the pressure sensor is indirectly supported by at least one of the frame, the storage box, the engine body, the intake system component, or the fuel system component through another member of the leak detection device.

FIGS. 5A through 5C schematically illustrate an example of a state where at least one of the vent valve 41, the suction pump 42, or the pressure sensor 43 in the leak detection device 40 is indirectly supported by at least one of the frame 10, the storage box 20, the engine body 7a, the intake system component 8a, or the fuel system component 9a through another member of the leak detection device 40.

Figure 6A:
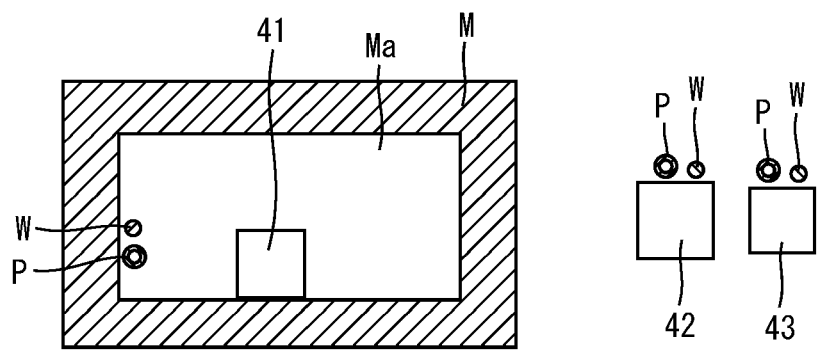
FIG. 6A is a view schematically illustrating an example of a state where at least one of the vent valve, the suction pump, or the pressure sensor is supported by at least one of the frame, the storage box, the engine body, the intake system component, or the fuel system component in an internal space.
Figure 6B:
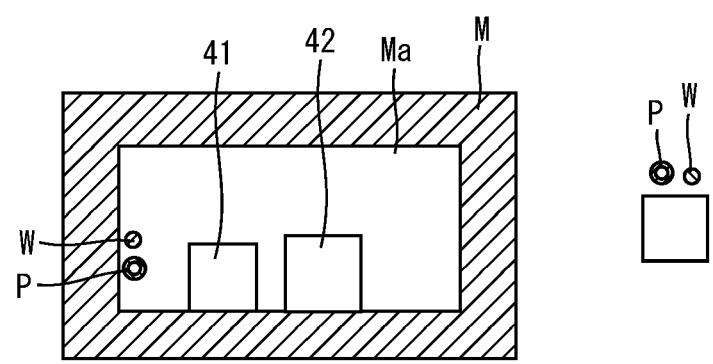
FIG. 6B is a view schematically illustrating an example of the state where at least one of the vent valve, the suction pump, or the pressure sensor is supported by at least one of the frame, the storage box, the engine body, the intake system component, or the fuel system component in the internal space.
Figure 6C:
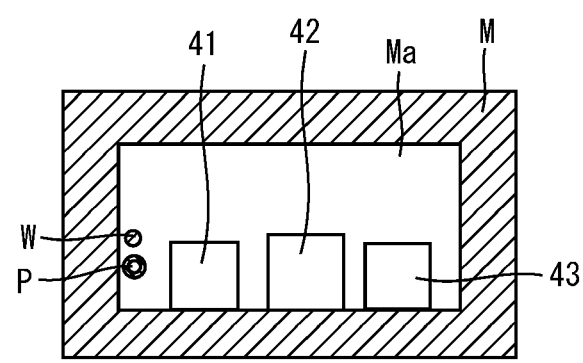
FIG. 6C is a view schematically illustrating an example of the state where at least one of the vent valve, the suction pump, or the pressure sensor is supported by at least one of the frame, the storage box, the engine body, the intake system component, or the fuel system component in the internal space.

FIGS. 6A through 6C schematically illustrate an example of a state where at least one of the vent valve 41, the suction pump 42, or the pressure sensor 43 in the leak detection device 40 is supported in an internal space by at least one of the frame 10, the storage box 20, the engine body 7a, the intake system component 8a, or the fuel system component 9a.

Figure 7A:
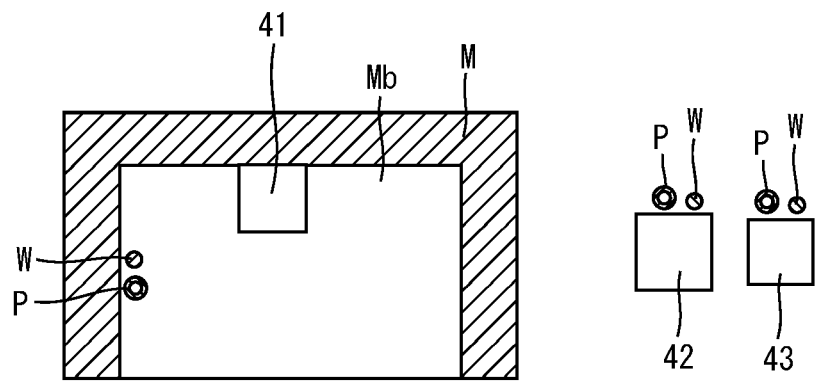
FIG. 7A is a view schematically illustrating an example of a state where at least one of the vent valve, the suction pump, or the pressure sensor is supported by at least one of the frame, the storage box, the engine body, the intake system component, or the fuel system component in a recess.
Figure 7B:
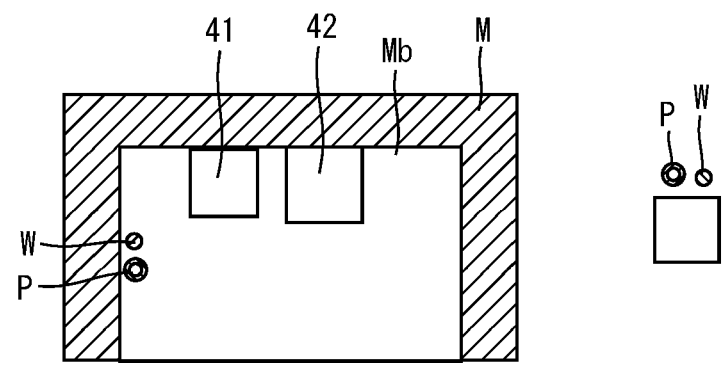
FIG. 7B is a view schematically illustrating an example of the state where at least one of the vent valve, the suction pump, or the pressure sensor is supported by at least one of the frame, the storage box, the engine body, the intake system component, or the fuel system component in the recess.
Figure 7C:
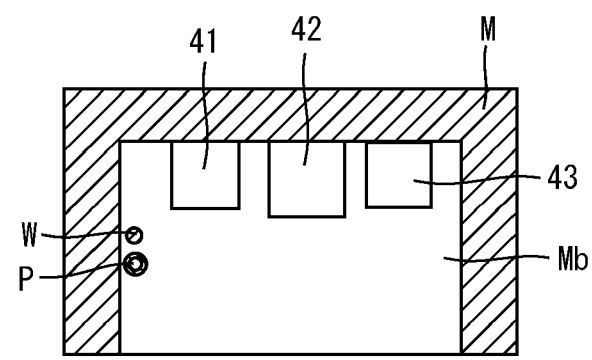
FIG. 7C is a view schematically illustrating an example of the state where at least one of the vent valve, the suction pump, or the pressure sensor is supported by at least one of the frame, the storage box, the engine body, the intake system component, or the fuel system component in the recess.

FIGS. 7A through 7C schematically illustrate an example of a state where at least one of the vent valve 41, the suction pump 42, or the pressure sensor 43 in the leak detection device 40 is supported in a recess by at least one of the frame 10, the storage box 20, the engine body 7a, the intake system component 8a, or the fuel system component 9a.

In FIGS. 3A through 7C, a structure as one of the frame 10, the storage box 20, the engine body 7a, the intake system component 8a, or the fuel system component 9a is denoted by character M for description. In FIGS. 3A through 7C, an electric wire W electrically connected to an electric component is disposed near the outer surface of the structure M. The electric wire W may be electrically connected to a component disposed along the outer surface of the structure M in the leak detection device 40. A pipe P constituting a part of a gas passage connected to the component disposed along the outer surface of the structure M in the leak detection device 40 is provided near the outer surface of the structure M. At least one of the electric wire W or the pipe P may be disposed in the structure M or an internal space thereof.

As illustrated in FIG. 3A, the vent valve 41 may be directly connected to the structure M. That is, the vent valve 41 may be directly supported by the structure M. The suction pump 42 may be directly supported by the structure M. The pressure sensor 43 may be directly supported by the structure M. In the leak detection device 40, a component directly supported by the structure M may be disposed in the top-bottom direction, the left-right direction, or the front-rear direction with respect to the structure M. In the leak detection device 40, a component not supported by the structure M is supported by a component other than the structure M in the vehicle.

As illustrated in FIG. 3B, two of the vent valve 41, the suction pump 42, or the pressure sensor 43 may be directly connected to the structure M. In the case illustrated in FIG. 3B, the vent valve 41 and the suction pump 42 are directly connected to the structure M. That is, the vent valve 41 and the suction pump 42 are directly supported by the structure M. The suction pump 42 and the pressure sensor 43 may be directly supported by the structure M. The pressure sensor 43 and the vent valve 41 may be directly supported by the structure M. A plurality of components directly supported by the structure M in the leak detection device 40 may be disposed in the top-bottom direction, the left-right direction, or the front-rear direction with respect to the structure M. or these components may be arranged in the top-bottom direction, the left-right direction, or the front-rear direction. A plurality of components directly supported by the structure M may be directly connected to each other or connected to each other through other components, or may not be connected to each other as illustrated in FIG. 3B. A component not directly supported by the structure M in the leak detection device 40 is supported by a component other than the structure M in the vehicle.

As illustrated in FIG. 3C, the vent valve 41, the suction pump 42, and the pressure sensor 43 may be directly supported by the structure M. The vent valve 41, the suction pump 42, and the pressure sensor 43 may be disposed in the top-bottom direction, the left-right direction, or the front-rear direction with respect to the structure M, or these components may be arranged in the top-bottom direction, the left-right direction, or the front-rear direction. At least two of the vent valve 41, the suction pump 42, or the pressure sensor 43 may be directly connected to each other or may be connected to each other through another member. As illustrated in FIG. 3C, the vent valve 41, the suction pump 42, and the pressure sensor 43 may not be connected to each other.

As illustrated in FIG. 6A, the vent valve 41 may be disposed in an internal space Ma of the structure M and directly connected to the structure M. That is, the vent valve 41 may be directly supported by the structure M in an internal space Ma of the structure M. The suction pump 42 may be directly supported by the structure M in the internal space Ma of the structure M. The pressure sensor 43 may be directly supported by the structure M in the internal space Ma of the structure M. In the leak detection device 40, a component directly supported by the structure M may be disposed in the top-bottom direction, the left-right direction, or the front-rear direction with respect to the structure M. In the leak detection device 40, a component not supported by the structure M is supported by a component other than the structure M in the vehicle.

As illustrated in FIG. 6B, two of the vent valve 41, the suction pump 42, or the pressure sensor 43 may be located in the internal space Ma of the structure M and directly connected to the structure M. In the case illustrated in FIG. 6B, the vent valve 41 and the suction pump 42 are directly connected to the structure M in the internal space Ma of the structure M. That is, the vent valve 41 and the suction pump 42 are directly supported by the structure M in the internal space Ma of the structure M. The suction pump 42 and the pressure sensor 43 may be directly supported by the structure M in the internal space Ma of the structure M. The pressure sensor 43 and the vent valve 41 may be directly supported by the structure M in the internal space Ma of the structure M. A plurality of components directly supported by the structure M in the leak detection device 40 may be disposed in the top-bottom direction, the left-right direction, or the front-rear direction with respect to the structure M, or these components may be arranged in the top-bottom direction, the left-right direction, or the front-rear direction. A plurality of components directly supported by the structure M may be directly connected to each other or connected to each other through other components, or may not be connected to each other as illustrated in FIG. 6B. A component not directly supported by the structure M in the leak detection device 40 is supported by a component other than the structure M in the vehicle.

As illustrated in FIG. 6C, in the case where the structure M has the internal space Ma, the vent valve 41, the suction pump 42, and the pressure sensor 43 may be directly supported by the structure M in the internal space Ma of the structure M. The vent valve 41, the suction pump 42, and the pressure sensor 43 may be disposed in the top-bottom direction, the left-right direction, or the front-rear direction with respect to the structure M. or these components may be arranged in the top-bottom direction, the left-right direction, or the front-rear direction. At least two of the vent valve 41, the suction pump 42, or the pressure sensor 43 may be directly connected to each other or may be connected to each other through another member. As illustrated in FIG. 6C, the vent valve 41, the suction pump 42, and the pressure sensor 43 may not be connected to each other.

As illustrated in FIG. 7A, in a case where the structure M has a recess Mb, the vent valve 41 may be disposed in the recess Mb of the structure M and directly connected to the structure M. That is, the vent valve 41 may be directly supported by the structure M in the recess Mb of the structure M. The suction pump 42 may be directly supported by the structure M in the recess Mb of the structure M. The pressure sensor 43 may be directly supported by the structure M in the recess Mb of the structure M. In the leak detection device 40, a component directly supported by the structure M may be disposed in the top-bottom direction, the left-right direction, or the front-rear direction with respect to the structure M. In the leak detection device 40, a component not supported by the structure M is supported by a component other than the structure M in the vehicle.

In at least one of the frame 10, the storage box 20, the engine body 7a, the intake system component 8a, or the fuel system component 9a, a recess is disposed in any one of the top-bottom direction, the left-right direction, or the front-rear direction.

As illustrated in FIG. 7B, two of the vent valve 41, the suction pump 42, or the pressure sensor 43 may be located in the recess Mb of the structure M and directly connected to the structure M. In the case illustrated in FIG. 7B, the vent valve 41 and the suction pump 42 are directly connected to the structure M in the recess Mb of the structure M. That is, the vent valve 41 and the suction pump 42 are directly supported by the structure M in the recess Mb of the structure M. The suction pump 42 and the pressure sensor 43 may be directly supported by the structure M in the recess Mb of the structure M. The pressure sensor 43 and the vent valve 41 may be directly supported by the structure M in the recess Mb of the structure M. A plurality of components directly supported by the structure M in the leak detection device 40 may be disposed in the top-bottom direction, the left-right direction, or the front-rear direction with respect to the structure M, or these components may be arranged in the top-bottom direction, the left-right direction, or the front-rear direction. A plurality of components directly supported by the structure M may be directly connected to each other or connected to each other through other components, or may not be connected to each other as illustrated in FIG. 7B. A component not directly supported by the structure M in the leak detection device 40 is supported by a component other than the structure M in the vehicle.

As illustrated in FIG. 7C, the vent valve 41, the suction pump 42, and the pressure sensor 43 may be directly supported by the structure M in the recess Mb of the structure M. The vent valve 41, the suction pump 42, and the pressure sensor 43 may be disposed in the top-bottom direction, the left-right direction, or the front-rear direction with respect to the structure M, or these components may be arranged in the top-bottom direction, the left-right direction, or the front-rear direction. At least two of the vent valve 41, the suction pump 42, or the pressure sensor 43 may be directly connected to each other or may be connected to each other through another member. As illustrated in FIG. 7C, the vent valve 41, the suction pump 42, and the pressure sensor 43 may not be connected to each other.

With the configuration described above, the leak detection device 40 may be arranged in a compact space with respect to at least one of the frame 10, the storage box 20, the engine body 7a, the intake system component 8a, or the fuel system component 9a.

In this embodiment, a component directly supported by the structure M in the leak detection device 40 is electrically connected to the electric wire W disposed along the outer surface of the structure M and is connected to the pipe P disposed along the outer surface of the structure M.

Figure 4A:
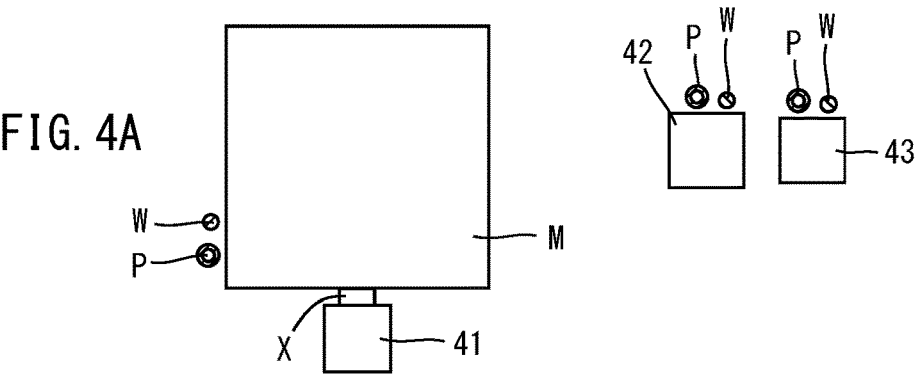
FIG. 4A is a view schematically illustrating an example of a state where at least one of the vent valve, the suction pump, or the pressure sensor is indirectly supported by at least one of the frame, the storage box, the engine body, the intake system component, or the fuel system component through a connection member.

As illustrated in FIG. 4A, the vent valve 41 may be indirectly connected to the structure M. Specifically, the vent valve 41 may be indirectly supported by the structure M through the connection member X. The suction pump 42 may be indirectly supported by the structure M through the connection member X. The pressure sensor 43 may be indirectly supported by the structure M through the connection member X. In the leak detection device 40, a component indirectly connected to the structure M may be disposed in the top-bottom direction, the left-right direction, or the front-rear direction with respect to the structure M. In the leak detection device 40, a component not indirectly supported by the structure M is supported by a component other than the structure M in the vehicle.

Figure 4B:
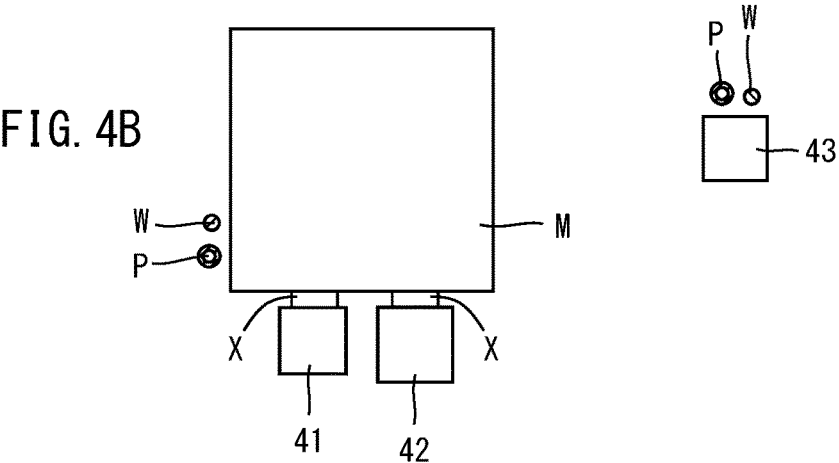
FIG. 4B is a view schematically illustrating an example of the state where at least one of the vent valve, the suction pump, or the pressure sensor is indirectly supported by at least one of the frame, the storage box, the engine body, the intake system component, or the fuel system component through the connection member.

As illustrated in FIG. 4B, two of the vent valve 41, the suction pump 42, or the pressure sensor 43 may be indirectly connected to the structure M. In the case illustrated in FIG. 4B, the vent valve 41 and the suction pump 42 are indirectly connected to the structure M. Specifically, the vent valve 41 and the suction pump 42 are indirectly supported by the structure M through the connection member X. The suction pump 42 and the pressure sensor 43 may be indirectly supported by the structure M through the connection member X. The pressure sensor 43 and the vent valve 41 may be indirectly supported by the structure M through the connection member X. A plurality of components indirectly connected to the structure M in the leak detection device 40 may be disposed in the top-bottom direction, the left-right direction, or the front-rear direction with respect to the structure M, or these components may be arranged in the top-bottom direction, the left-right direction, or the front-rear direction. A plurality of components indirectly connected to the structure M in the leak detection device 40 may be directly connected to each other or connected to each other through other components, or may not be connected to each other as illustrated in FIG. 4B. In a case where two components indirectly connected to the structure M are connected to each other, only one of the components may be indirectly supported by the structure M through the connection member X. In the leak detection device 40, a component not supported by the structure M is supported by a component other than the structure M in the vehicle.

Figure 4C:
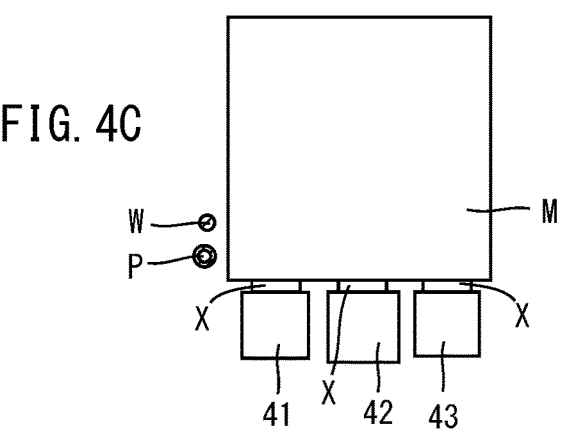
FIG. 4C is a view schematically illustrating an example of the state where at least one of the vent valve, the suction pump, or the pressure sensor is indirectly supported by at least one of the frame, the storage box, the engine body, the intake system component, or the fuel system component through the connection member.
Figure 4D:
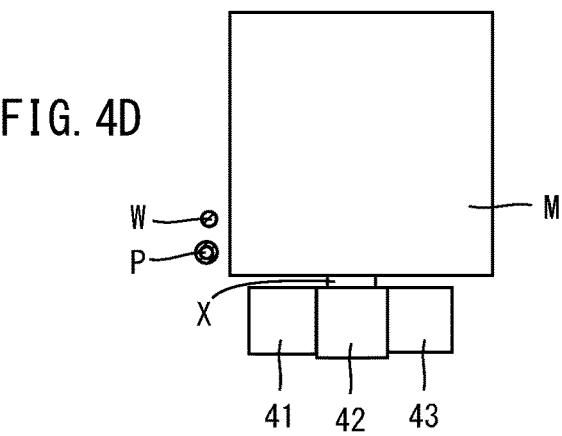
FIG. 4D is a view schematically illustrating an example of the state where at least one of the vent valve, the suction pump, or the pressure sensor is indirectly supported by at least one of the frame, the storage box, the engine body, the intake system component, or the fuel system component through the connection member.

As illustrated in FIG. 4C, the vent valve 41, the suction pump 42, and the pressure sensor 43 may be indirectly connected to the structure M. That is, each of the vent valve 41, the suction pump 42, and the pressure sensor 43 may be indirectly supported by the structure M through the connection member X. As illustrated in FIG. 4D, the vent valve 41, the suction pump 42, and the pressure sensor 43 may be connected to each other and indirectly supported by the structure M through at least one connection member X.

In FIGS. 4C and 4D, the vent valve 41, the suction pump 42, and the pressure sensor 43 may be disposed in the top-bottom direction, the left-right direction, or the front-rear direction with respect to the structure M, or these components may be arranged in the top-bottom direction, the left-right direction, or the front-rear direction. At least two of the vent valve 41, the suction pump 42, or the pressure sensor 43 may be directly connected to each other or may be connected to each other through another member. In this case, it is sufficient that at least one of connected components of the vent valve 41, the suction pump 42, or the pressure sensor 43 is indirectly supported by the structure M through the connection member X.

Although not specifically shown, as described above, at least one of the vent valve 41, the suction pump 42, or the pressure sensor 43 indirectly supported by the structure M through the connection member X may be disposed in the internal space Ma of the structure M in a manner similar to the configuration illustrated in FIGS. 6A, 6B, and 6C. That is, at least one of the vent valve 41, the suction pump 42, or the pressure sensor 43 may be indirectly supported by the structure M in the internal space Ma of the structure M through the connection member X.

Although not specifically shown, as described above, at least one of the vent valve 41, the suction pump 42, or the pressure sensor 43 indirectly supported by the structure M through the connection member X may be disposed in the recess Mb of the structure M in a manner similar to the configuration illustrated in FIGS. 7A, 7B, and 7C. That is, at least one of the vent valve 41, the suction pump 42, or the pressure sensor 43 may be indirectly supported by the structure M in the recess Mb of the structure M through the connection member X.

With the configuration described above, the leak detection device 40 may be arranged in a compact space with respect to at least one of the frame 10, the storage box 20, the engine body 7a, the intake system component 8a, or the fuel system component 9a.

In this embodiment, a component indirectly supported by the structure M in the leak detection device 40 is electrically connected to the electric wire W disposed along the outer surface of the structure M and is connected to the pipe P disposed along the outer surface of the structure M.

As illustrated in FIG. 5A, the vent valve 41 may be supported by the suction pump 42 directly connected to the structure M. That is, the vent valve 41 may be indirectly supported by the structure M. The vent valve 41 may be supported by the pressure sensor 43 directly connected to the structure M. The suction pump 42 may be supported by the vent valve 41 directly connected to the structure M. The suction pump 42 may be supported by the pressure sensor 43 directly connected to the structure M. The pressure sensor 43 may be supported by the vent valve 41 directly connected to the structure M. The pressure sensor 43 may be supported by the suction pump 42 directly connected to the structure M. In the leak detection device 40, a component not directly or indirectly supported by the structure M is supported by a component other than the structure M in the vehicle.

As illustrated in FIG. 5B, two of the vent valve 41, the suction pump 42, or the pressure sensor 43 may be directly connected to the structure M with the other being supported by a component directly connected to the structure M. In the case illustrated in FIG. 5B, the suction pump 42 and the pressure sensor 43 are directly connected to the structure M, and the vent valve 41 is supported by the suction pump 42. That is, the suction pump 42 and the pressure sensor 43 are directly connected to the structure M, and the vent valve 41 is indirectly supported by the structure M. The suction pump 42 and the pressure sensor 43 may be directly connected to the structure M with the vent valve 41 supported by the pressure sensor 43. The vent valve 41 and the suction pump 42 may be directly connected to the structure M with the pressure sensor 43 supported by the vent valve 41 or the suction pump 42. The pressure sensor 43 and the vent valve 41 may be directly connected to the structure M with the suction pump 42 supported by the pressure sensor 43 or the vent valve 41. Two components directly supported by the structure M may be directly connected to each other or connected through another component, or may not be connected to each other as illustrated in FIG. 5B. In the leak detection device 40, a component not directly or indirectly supported by the structure M is supported by a component other than the structure M in the vehicle.

As illustrated in FIG. 5C, at least one of the vent valve 41, the suction pump 42, or the pressure sensor 43 may be directly connected to the structure M with the other being supported by a component directly connected to the structure M. In the case illustrated in FIG. 5C, the suction pump 42 is directly connected to the structure M, and the vent valve 41 and the pressure sensor 43 are supported by the suction pump 42. That is, the suction pump 42 is directly connected to the structure M, and the vent valve 41 and the pressure sensor 43 are indirectly supported by the structure M. The pressure sensor 43 may be directly connected to the structure M with the vent valve 41 and the suction pump 42 supported by the pressure sensor 43. The vent valve 41 may be directly connected to the structure M with the suction pump 42 and the pressure sensor 43 supported by the vent valve 41. The vent valve 41 and the suction pump 42 may be directly connected to the structure M with the pressure sensor 43 supported by the vent valve 41 and the suction pump 42. The suction pump 42 and the pressure sensor 43 may be directly connected to the structure M with the vent valve 41 supported by the suction pump 42 and the pressure sensor 43. The pressure sensor 43 and the vent valve 41 may be directly connected to the structure M with the suction pump 42 supported by the pressure sensor 43 and the vent valve 41. The vent valve 41, the suction pump 42, and the pressure sensor 43 may be connected in series in a direction away from the structure M. The vent valve 41, the suction pump 42, and the pressure sensor 43 may be connected to each other along the outer surface of the structure M.

Although not specifically shown, at least one of the vent valve 41, the suction pump 42, or the pressure sensor 43 supported by the structure M as described above may be supported by the structure M in the internal space Ma of the structure M in a manner similar to the configuration illustrated in FIGS. 6A, 6B, and 6C. That is, at least one of the vent valve 41, the suction pump 42, or the pressure sensor 43 may be supported by the structure M in the internal space Ma of the structure M.

A plurality of components supported by the structure M in the leak detection device 40 may be disposed in the top-bottom direction, the left-right direction, or the front-rear direction with respect to the structure M, or these components may be arranged in the top-bottom direction, the left-right direction, or the front-rear direction.

With the configuration described above, the leak detection device 40 may be arranged in a compact space with respect to at least one of the frame 10, the storage box 20, the engine body 7a, the intake system component 8a, or the fuel system component 9a.

In this embodiment, a component directly supported by the structure M in the leak detection device 40 is electrically connected to the electric wire W disposed along the outer surface of the structure M and is connected to the pipe P disposed along the outer surface of the structure M.

The vehicle 1 according to this embodiment is a straddled vehicle including: the frame 10; the seat 15 supported by the frame 10; the storage box 20 supported by the frame 10; the engine body 7a constituting at least a part of the engine and at least partially overlapping with the seat when seen from above; the intake system component 8a constituting the intake system 8 configured to take air into the engine; the fuel system component 9a constituting the fuel system 9 including the fuel tank 9b configured to store fuel F to be supplied to the engine; and the evaporative emission system 30 configured to collect the fuel evaporation gas Gf generated in the fuel tank 9b by using the canister 33, to introduce the outside air Ga to the canister 33 from the ben vent pipe 34 for introducing the outside air Ga. and to discharge the collected fuel evaporation gas Gf and the introduced outside air Ga from the canister 33 into the intake pipe 7b of the engine. The vehicle 1 includes the pressure sensor 43 including the vent pipe 34 and configured to measure a pressure in the gas passage in which the gas G including at least one of the fuel evaporation gas Gf or the outside air Ga flows in the evaporative emission system 30, and also includes at least one of the electric vent valve 41 configured to switch between the closed state where the vent pipe 34 is closed and the open state where the vent pipe 34 is open, or the electric suction pump 42 configured to suck the gas G in the gas passage. At least one of the pressure sensor 43, the vent valve 41, or the suction pump 42 is supported by at least one of the frame 10, the storage box 20, the engine body 7a, the intake system component 8a, or the fuel system component 9a.

Components included in each of the frame 10, the storage box 20, the engine body 7a, the intake system component 8a, or the fuel system component 9a of the vehicle 1 have common characteristics of, such as a larger volume than those of the other components, a larger surface area than those of the other components, a shape elongated in at least one of the top-bottom direction, the left-right direction, or the front-rear direction, obtaining support stiffness to the vehicle body 2, and including or supporting an electric component to which the electric wire is connected.

At least one of the vent valve 41, the suction pump 42, or the pressure sensor 43 of the leak detection device 40 for detecting leakage of a gas in the evaporative emission system 30 can be disposed with respect to at least one of the frame 10, the storage box 20, the engine body 7a, the intake system component 8a, or the fuel system component 9a, by using the common characteristics as described above.

In this manner, an electric wire connected to at least one of the vent valve 41, the suction pump 42, or the pressure sensor 43 can be shared with the electric wire W disposed near at least one of the frame 10, the storage box 20, the engine body 7a, the intake system component 8a, or the fuel system component 9a or can be constituted by an electric wire branched off from the electric wire W.

The pipe P constituting the gas passage connected to at least one of the vent valve 41, the suction pump 42, or the pressure sensor 43 can be disposed along the outer surface of at least one of the frame 10, the storage box 20, the engine body 7a, the intake system component 8a, or the fuel system component 9a.

Since at least one of the vent valve 41, the suction pump 42, or the pressure sensor 43 is supported by at least one of the frame 10, the storage box 20, the engine body 7a, the intake system component 8a, or the fuel system component 9a having support stiffness to the vehicle body 2, support stiffness of at least one of the vent valve 41, the suction pump 42, or the pressure sensor 43 can be obtained.

Thus, with the configuration described above, it is possible to obtain the vehicle 1 in which components for a leak test of a gas in the evaporative emission system 30 are arranged to obtain support stiffness while easily avoiding interference of the electric wire W and the gas passage connected to the components with other components.

In this embodiment, at least one of the vent valve 41, the suction pump 42, or the pressure sensor 43 is connected to at least one of the frame 10, the storage box 20, the engine body 7a, the intake system component 8a, or the fuel system component 9a through the connection member X or connected to at least one of the frame 10, the engine body 7a, the intake system component 8a, or the fuel system component 9a while being in contact therewith.

Accordingly, at least one of the vent valve 41, the suction pump 42, or the pressure sensor 43 can be supported by at least one of the frame 10, the storage box 20, the engine body 7a, the intake system component 8a, or the fuel system component 9a.

Thus, with the configuration described above, it is possible to obtain the vehicle in which components for a leak test of a gas in the evaporative emission system 30 are arranged to easily avoid interference of the electric wire W and the gas passage connected to the components with other components.

Second Embodiment

Figure 8A:
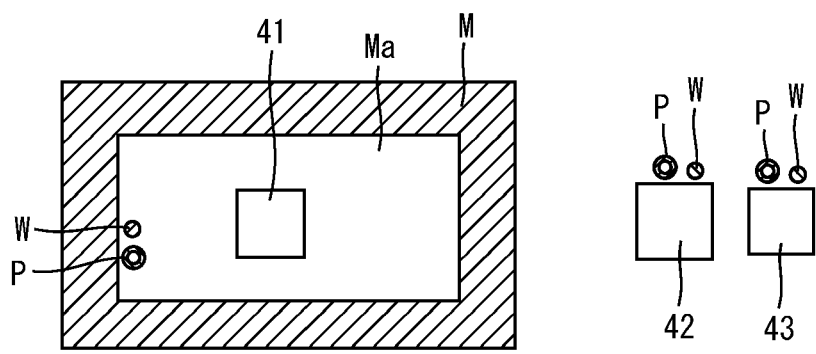
FIG. 8A is a view schematically illustrating an example of a state where at least one of the vent valve, the suction pump, or the pressure sensor is disposed in an internal space of at least one of the frame, the storage box, the engine body, the intake system component, or the fuel system component.
Figure 8B:
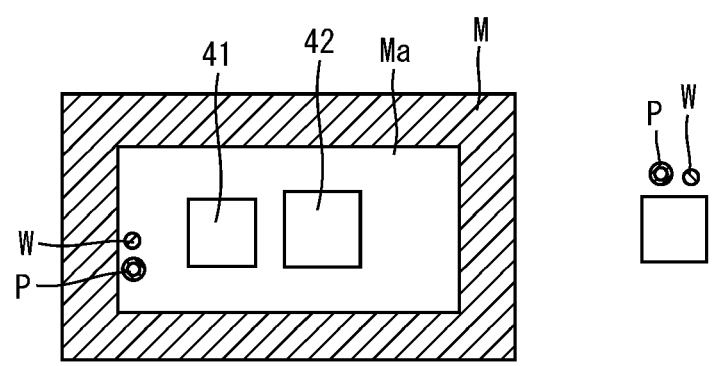
FIG. 8B is a view schematically illustrating an example of the state where at least one of the vent valve, the suction pump, or the pressure sensor is disposed in the internal space of at least one of the frame, the storage box, the engine body, the intake system component, or the fuel system component.
Figure 8C:
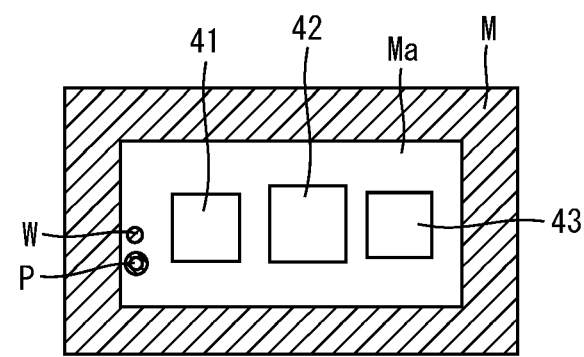
FIG. 8C is a view schematically illustrating an example of the state where at least one of the vent valve, the suction pump, or the pressure sensor is disposed in the internal space of at least one of the frame, the storage box, the engine body, the intake system component, or the fuel system component.

FIGS. 8A through 8C schematically illustrate an example of arrangement of a leak detection device 40 in a vehicle as a straddled vehicle according to a second embodiment. In this embodiment, the configuration of the vehicle except for arrangement of the leak detection device 40 is the same as that of the first embodiment. Thus, the vehicle will not be specifically described below.

In this embodiment, as illustrated in FIGS. 8A through 8C, at least one of a vent valve 41, a suction pump 42, or a pressure sensor 43 in the leak detection device 40 is disposed in an internal space Ma of at least one of a frame 10, a storage box 20, an engine body 7a, an intake system component 8a, or a fuel system component 9a.

At least one of the frame 10, the storage box 20, the engine body 7a, the intake system component 8a, or the fuel system component 9a can have an internal space in some cases in terms of structure. In such a case where at least one of the frame 10, the storage box 20, the engine body 7a, the intake system component 8a, or the fuel system component 9a has an internal space, at least one of the vent valve 41, the suction pump 42, or the pressure sensor 43 in the leak detection device is disposed in the internal space Ma of the at least one of the components.

FIGS. 8A through 8C schematically illustrate an example of a state where at least one of the vent valve 41, the suction pump 42, or the pressure sensor 43 in the leak detection device 40 is disposed in the internal space Ma of at least one of the frame 10, the storage box 20, the engine body 7a, the intake system component 8a, or the fuel system component 9a.

In FIGS. 8A through 8C, one of the frame 10, the storage box 20, the engine body 7a, the intake system component 8a, or the fuel system component 9a is denoted by character M for description. Character Ma denotes an internal space. In FIGS. 8A through 8C, an electric wire W electrically connected to an electric component is disposed in the internal space Ma of a structure M. The electric wire W may be electrically connected to a component disposed in the internal space Ma in the leak detection device 40. A pipe P constituting a part of a gas passage connected to the leak detection device 40 is disposed in the internal space Ma. The pipe P may be disposed along an inner surface constituting the internal space Ma of the structure M. At least one of the electric wire W or the pipe P may be disposed inside or outside the structure M.

As illustrated in FIG. 8A, the vent valve 41 may be disposed in the internal space Ma of the structure M. The suction pump 42 may be disposed in the internal space Ma. The pressure sensor 43 may be disposed in the internal space Ma. In the leak detection device 40, a component not disposed in the internal space Ma is disposed outside the structure M.

As illustrated in FIG. 8B, two of the vent valve 41, the suction pump 42, or the pressure sensor 43 may be disposed in the internal space Ma. In the case illustrated in FIG. 8B, the vent valve 41 and the suction pump 42 are disposed in the internal space Ma. The suction pump 42 and the pressure sensor 43 may be disposed in the internal space Ma. The pressure sensor 43 and the vent valve 41 may be disposed in the internal space Ma. In the leak detection device 40, a plurality of components disposed in the internal space Ma may be arranged in the top-bottom direction, the left-right direction, or the front-rear direction. A plurality of components disposed in the internal space Ma may be directly connected to each other or connected to each other through other components, or may not be connected to each other. In the leak detection device 40, a component not disposed in the internal space Ma is disposed outside the structure M.

As illustrated in FIG. 8C, the vent valve 41, the suction pump 42, and the pressure sensor 43 may be disposed in the internal space Ma. The vent valve 41, the suction pump 42, and the pressure sensor 43 may be arranged in the top-bottom direction, the left-right direction, or the front-rear direction. At least two of the vent valve 41, the suction pump 42, or the pressure sensor 43 may be directly connected to each other or may be connected to each other through another member. The vent valve 41, the suction pump 42, and the pressure sensor 43 may not be connected to each other.

Accordingly, the leak detection device 40 may be arranged in a compact space with respect to at least one of the frame 10, the storage box 20, the engine body 7a, the intake system component 8a, or the fuel system component 9a.

In this embodiment, a component disposed in the internal space Ma in the leak detection device 40 is electrically connected to the electric wire W disposed in the internal space Ma. and connected to the pipe P disposed in the internal space Ma.

A vehicle 1 according to this embodiment is a straddled vehicle including: the frame 10; a seat 15 supported by the frame 10; the storage box 20 supported by the frame 10; the engine body 7a constituting at least a part of the engine and at least partially overlapping with the seat when seen from above; the intake system component 8a constituting the intake system 8 configured to take air into the engine; the fuel system component 9a constituting the fuel system 9 including the fuel tank 9b configured to store fuel F to be supplied to the engine; and an evaporative emission system 30 configured to collect a fuel evaporation gas Gf generated in the fuel tank 9b by using a canister 33, to introduce outside air Ga to the canister 33 from a vent pipe 34 for introducing the outside air Ga, and to discharge the collected fuel evaporation gas Gf and the introduced outside air Ga from the canister 33 into the intake pipe 7b of the engine. The vehicle 1 includes a pressure sensor 43 including the vent pipe 34 and configured to measure a pressure in the gas passage in which the gas G including at least one of the fuel evaporation gas Gf or the outside air Ga flows in the evaporative emission system 30, also includes at least one of the electric vent valve 41 configured to switch between a closed state in which the vent pipe 34 is closed and an open state in which the vent pipe 34 is open, or the electric suction pump 42 configured to suck the gas G in the gas passage. At least one of the pressure sensor 43, the vent valve 41, or the suction pump 42 is disposed in the internal space Ma of at least one of the frame 10, the storage box 20, the engine body 7a, the intake system component 8a, or the fuel system component 9a.

At least one of the vent valve 41, the suction pump 42, or the pressure sensor 43 of the leak detection device 40 for detecting leakage of a gas in the evaporative emission system 30 can be disposed with respect to at least one of the frame 10, the storage box 20, the engine body 7a, the intake system component 8a, or the fuel system component 9a, by using the common characteristics as described in the first embodiment.

In this manner, an electric wire connected to at least one of the vent valve 41, the suction pump 42, or the pressure sensor 43 can be shared with the electric wire W disposed near at least one of the frame 10, the storage box 20, the engine body 7a, the intake system component 8a, or the fuel system component 9a or can be constituted by an electric wire branched off from the electric wire W.

The pipe P constituting the gas passage connected to at least one of the vent valve 41, the suction pump 42, or the pressure sensor 43 can be disposed along a surface constituting the internal space Ma of at least one of the frame 10, the storage box 20, the engine body 7a, the intake system component 8a, or the fuel system component 9a.

Thus, with the configuration described above, it is possible to obtain the vehicle 1 in which components for a leak test of a gas in the evaporative emission system 30 are arranged to easily avoid interference of the electric wire W and the gas passage connected to the components with other components.

Third Embodiment

FIGS. 9A through 10C schematically illustrate an example of arrangement of a leak detection device 40 in a vehicle as a straddled vehicle according to a third embodiment. In this embodiment, the configuration of the vehicle except for arrangement of the leak detection device 40 is the same as that of the first embodiment. Thus, the vehicle will not be specifically described below.

In this embodiment, as illustrated in FIGS. 9A through 10C, at least one of a vent valve 41, a suction pump 42, or a pressure sensor 43 in the leak detection device is disposed along the outer surface of at least one of a frame 10, a storage box 20, an engine body 7a, an intake system component 8a, or a fuel system component 9a. To dispose along the outer surface of at least one of the frame 10, the storage box 20, the engine body 7a, the intake system component 8a, or the fuel system component 9a includes the case of disposing the at least one component in a recess in a case where at least one of the frame 10, the storage box 20, the engine body 7a, the intake system component 8a, or the fuel system component 9a has the recess.

At least one of the frame 10, the storage box 20, the engine body 7a, the intake system component 8a, or the fuel system component 9a can have a recess in some cases in terms of structure. In such a case where at least one of the frame 10, the storage box 20, the engine body 7a, the intake system component 8a, or the fuel system component 9a has a recess, at least one of the vent valve 41, the suction pump 42, or the pressure sensor 43 in the leak detection device may be disposed in the recess of the at least one of the components. In at least one of the frame 10, the storage box 20, the engine body 7a, the intake system component 8a, or the fuel system component 9a, a recess is disposed in any one of the top-bottom direction, the left-right direction, or the front-rear direction.

Figure 9A:
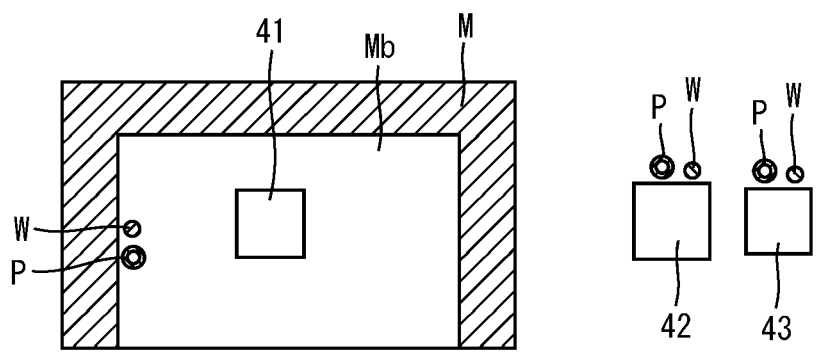
FIG. 9A is a view schematically illustrating an example of a state where at least one of the vent valve, the suction pump, or the pressure sensor is disposed in a recess of at least one of the frame, the storage box, the engine body, the intake system component, or the fuel system component.
Figure 9B:
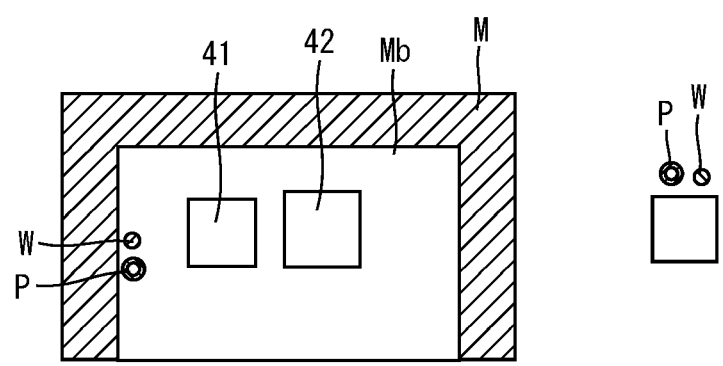
FIG. 9B is a view schematically illustrating an example of the state where at least one of the vent valve, the suction pump, or the pressure sensor is disposed in the recess of at least one of the frame, the storage box, the engine body, the intake system component, or the fuel system component.
Figure 9C:
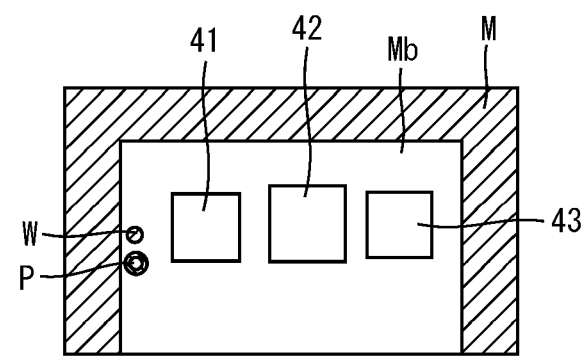
FIG. 9C is a view schematically illustrating an example of the state where at least one of the vent valve, the suction pump, or the pressure sensor is disposed in the recess of at least one of the frame, the storage box, the engine body, the intake system component, or the fuel system component.

FIGS. 9A through 9C schematically illustrate an example of a state where at least one of the vent valve 41, the suction pump 42, or the pressure sensor 43 in the leak detection device 40 is disposed in a recess Mb of at least one of the frame 10, the storage box 20, the engine body 7a, the intake system component 8a, or the fuel system component 9a.

In FIGS. 9A through 9C, one of the frame 10, the storage box 20, the engine body 7a, the intake system component 8a, or the fuel system component 9a is denoted by character M for description. Reference numeral Mb denotes a recess. In FIGS. 9A through 9C, an electric wire W electrically connected to an electric component is disposed in the recess Mb of the structure M. The electric wire W may be electrically connected to a component disposed in the recess Mb in the leak detection device 40. A pipe P constituting a part of a gas passage connected to the leak detection device 40 is disposed in the recess Mb. The pipe P may be disposed along an inner surface constituting the recess Mb of the structure M. At least one of the electric wire W or the pipe P may be disposed inside or outside the structure M.

As illustrated in FIG. 9A, the vent valve 41 may be disposed in the recess Mb of the structure M. The suction pump 42 may be disposed in the recess Mb. The pressure sensor 43 may be disposed in the recess Mb. In the leak detection device 40, a component not disposed in the recess Mb is disposed outside the structure M.

As illustrated in FIG. 9B, two of the vent valve 41, the suction pump 42, or the pressure sensor 43 in the leak detection device 40 may be disposed in the recess Mb. In the case illustrated in FIG. 9B, the vent valve 41 and the suction pump 42 are disposed in the recess Mb. The suction pump 42 and the pressure sensor 43 may be disposed in the recess Mb. The pressure sensor 43 and the vent valve 41 may be disposed in the recess Mb. In the leak detection device 40, a plurality of components disposed in the recess Mb may be arranged in the top-bottom direction, the left-right direction, or the front-rear direction. A plurality of components disposed in the recess Mb may be directly connected to each other or connected to each other through other components, or may not be connected to each other. In the leak detection device 40, a component not disposed in the recess Mb is disposed outside the structure M.

As illustrated in FIG. 9C, the vent valve 41, the suction pump 42, and the pressure sensor 43 in the leak detection device 40 may be disposed in the recess Mb. The vent valve 41, the suction pump 42, and the pressure sensor 43 may be arranged in the top-bottom direction, the left-right direction, or the front-rear direction. At least two of the vent valve 41, the suction pump 42, or the pressure sensor 43 may be directly connected to each other or may be connected to each other through another member. The vent valve 41, the suction pump 42, and the pressure sensor 43 may not be connected to each other.

Accordingly, the leak detection device 40 may be arranged in a compact space with respect to at least one of the frame 10, the storage box 20, the engine body 7a, the intake system component 8a, or the fuel system component 9a.

In the examples illustrated in FIGS. 9A through 9C, a component disposed in the recess Mb in the leak detection device 40 is electrically connected to the electric wire W disposed in the recess Mb, and connected to the pipe P in the recess Mb.

At least one of the vent valve 41, the suction pump 42, or the pressure sensor 43 in the leak detection device 40 may be disposed along the outer surface except for the recess of the frame 10, the storage box 20, the engine body 7a, the intake system component 8a, or the fuel system component 9a.

Figure 10A:
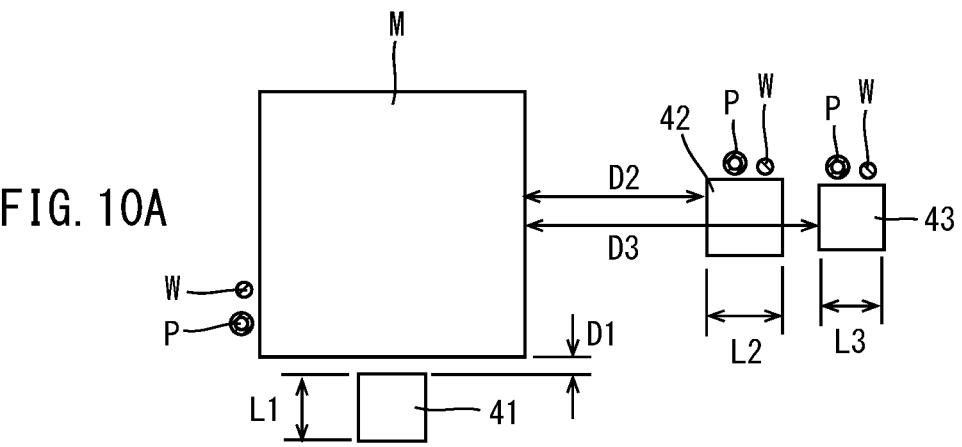
FIG. 10A is a view schematically illustrating an example of a state where at least one of the vent valve, the suction pump, or the pressure sensor is disposed along an outer surface of at least one of the frame, the storage box, the engine body, the intake system component, or the fuel system component.
Figure 10B:
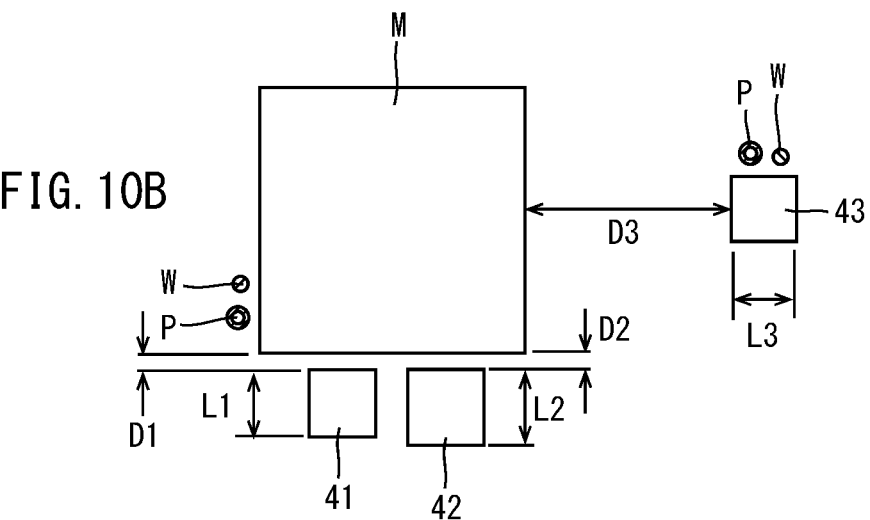
FIG. 10B is a view schematically illustrating an example of the state where at least one of the vent valve, the suction pump, or the pressure sensor is disposed along the outer surface of at least one of the frame, the storage box, the engine body, the intake system component, or the fuel system component.
Figure 10C:
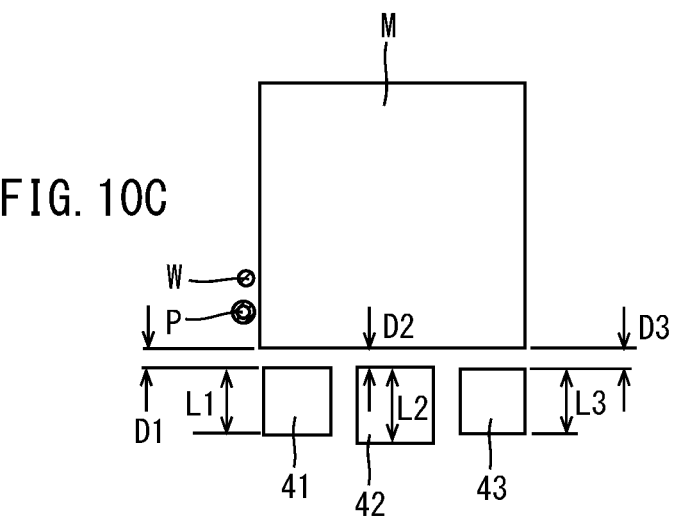
FIG. 10C is a view schematically illustrating an example of the state where at least one of the vent valve, the suction pump, or the pressure sensor is disposed along the outer surface of at least one of the frame, the storage box, the engine body, the intake system component, or the fuel system component.

FIGS. 10A through 10C schematically illustrate an example of a state where at least one of the vent valve 41, the suction pump 42, or the pressure sensor 43 in the leak detection device 40 is disposed along the outer surface of at least one of the frame 10, the storage box 20, the engine body 7a, the intake system component 8a, or the fuel system component 9a.

In FIGS. 10A through 10C, one of the frame 10, the storage box 20, the engine body 7a, the intake system component 8a, or the fuel system component 9a is denoted by character M for description. In FIGS. 10A through 10C, an electric wire W electrically connected to an electric component is disposed near the outer surface of the structure M. The electric wire W may be electrically connected to a component disposed along the outer surface of the structure M in the leak detection device 40. A pipe P constituting a part of a gas passage connected to the component disposed along the outer surface of the structure M in the leak detection device 40 is provided near the outer surface of the structure M. At least one of the electric wire W or the pipe P may be disposed in the structure M or an internal space thereof.

As illustrated in FIG. 10A, the vent valve 41 may be disposed along the outer surface of the structure M. The suction pump 42 may be disposed along the outer surface of the structure M. The pressure sensor 43 may be disposed along the outer surface of the structure M. In the leak detection device 40, a component disposed along the outer surface of the structure M may be disposed in the top-bottom direction, the left-right direction, or the front-rear direction with respect to the structure M. In the leak detection device 40, a component not disposed along the outer surface of the structure M is separated from the outer surface of the structure M.

As illustrated in FIG. 10A, a minimum distance D1 between the outer surface of the structure M and a component (the vent valve 41 in the example illustrated in FIG. 10A) disposed along the outer surface of the structure M is smaller than a maximum dimension L1 of the component. On the other hand, minimum distances D2 and D3 from the outer surface of the structure M to components (the suction pump 42 and the pressure sensor 43 in the example illustrating FIG. 10A) separated from the outer surface of the structure M are respectively larger than maximum dimensions L2 and L3 of the components.

As illustrated in FIG. 10B, two of the vent valve 41, the suction pump 42, or the pressure sensor 43 may be disposed along the outer surface of the structure M. In the case illustrated in FIG. 10B, the vent valve 41 and the suction pump 42 are disposed along the outer surface of the structure M. The suction pump 42 and the pressure sensor 43 may be disposed along the outer surface of the structure M. The pressure sensor 43 and the vent valve 41 may be disposed along the outer surface of the structure M. A plurality of components disposed along the outer surface of the structure M in the leak detection device 40 may be disposed in the top-bottom direction, the left-right direction, or the front-rear direction with respect to the structure M. or these components may be arranged in the top-bottom direction, the left-right direction, or the front-rear direction. A plurality of components disposed along the outer surface of the structure M may be directly connected to each other or connected to each other through other components, or may not be connected to each other. In the leak detection device 40, a component not disposed along the outer surface of the structure M is disposed outside the structure M.

As illustrated in FIG. 10B, the minimum distances DI and D2 from the outer surface of the structure M to components (the vent valve 41 and the suction pump 42 in the example illustrated in FIG. 10B) disposed along the outer surface of the structure M are respectively smaller than the maximum dimensions L1 and L2 of the components. On the other hand, the minimum distance D3 between the outer surface of the structure M and the component (the pressure sensor 43 in the example illustrating FIG. 10B) separated from the outer surface of the structure M is larger than the maximum dimension L3 of the component.

As illustrated in FIG. 10C, the vent valve 41, the suction pump 42, and the pressure sensor 43 may be disposed along the outer surface of the structure M. The vent valve 41, the suction pump 42, and the pressure sensor 43 may be disposed in the top-bottom direction, the left-right direction, or the front-rear direction with respect to the structure M, or these components may be arranged in the top-bottom direction, the left-right direction, or the front-rear direction. At least two of the vent valve 41, the suction pump 42, or the pressure sensor 43 may be directly connected to each other or may be connected to each other through another member. The vent valve 41, the suction pump 42, and the pressure sensor 43 may not be connected to each other.

As illustrated in FIG. 10C, the minimum distances D1, D2, and D3 from the outer surface of the structure M to components (the vent valve 41, the suction pump 42, and the pressure sensor 43 in the example illustrated in FIG. 10C) disposed along the outer surface of the structure M are respectively smaller than the maximum dimensions L1, L2, and L3 of the components.

Accordingly, the leak detection device 40 may be arranged in a compact space with respect to at least one of the frame 10, the storage box 20, the engine body 7a, the intake system component 8a, or the fuel system component 9a.

In this embodiment, a component disposed along the outer surface of the structure M in the leak detection device 40 is electrically connected to the electric wire W disposed along the outer surface of the structure M and is connected to the pipe P disposed along the outer surface of the structure M.

The vehicle 1 according to this embodiment is a straddled vehicle including: the frame 10; the seat 15 supported by the frame 10; the storage box 20 supported by the frame 10; the engine body 7a constituting at least a part of the engine and at least partially overlapping with the seat when seen from above; the intake system component 8a constituting the intake system 8 configured to take air into the engine; the fuel system component 9a constituting the fuel system 9 including the fuel tank 9b configured to store fuel F to be supplied to the engine; and the evaporative emission system 30 configured to collect the fuel evaporation gas Gf generated in the fuel tank 9b by using the canister 33, to introduce the outside air Ga to the canister 33 from the vent pipe 34 for introducing the outside air Ga, and to discharge the collected fuel evaporation gas Gf and the introduced outside air Ga from the canister 33 into the intake pipe 7b of the engine. The vehicle 1 includes the pressure sensor 43 including the vent pipe 34 and configured to measure a pressure in the gas passage in which the gas G including at least one of the fuel evaporation gas Gf or the outside air Ga flows in the evaporative emission system 30, also includes at least one of the electric vent valve 41 configured to switch between the closed state where the vent pipe 34 is closed and the open state where the vent pipe 34 is open, or the electric suction pump 42 configured to suck the gas G in the gas passage. At least one of the pressure sensor 43, the vent valve 41, or the suction pump 42 is disposed along the outer surface of at least one of the frame 10, the storage box 20, the engine body 7a, the intake system component 8a, or the fuel system component 9a.

At least one of the vent valve 41, the suction pump 42, or the pressure sensor 43 of the leak detection device 40 for detecting leakage of a gas in the evaporative emission system 30 can be disposed with respect to at least one of the frame 10, the storage box 20, the engine body 7a, the intake system component 8a, or the fuel system component 9a, by using the common characteristics as described in the first embodiment.

In this manner, an electric wire connected to at least one of the vent valve 41, the suction pump 42, or the pressure sensor 43 can be shared with the electric wire W disposed near at least one of the frame 10, the storage box 20, the engine body 7a, the intake system component 8a, or the fuel system component 9a or can be constituted by an electric wire branched off from the electric wire W.

The pipe P constituting the gas passage connected to at least one of the vent valve 41, the suction pump 42, or the pressure sensor 43 can be disposed along the outer surface of at least one of the frame 10, the storage box 20, the engine body 7a, the intake system component 8a, or the fuel system component 9a.

Thus, with the configuration described above, it is possible to obtain the vehicle 1 in which components for a leak test of a gas in the evaporative emission system 30 are arranged to easily avoid interference of the electric wire W and the gas passage connected to the components with other components.

In this embodiment, at least one of the vent valve 41, the suction pump 42, or the pressure sensor 43 is disposed in the recess Mb constituted by the outer surface of at least one of the frame 10, the storage box 20, the engine body 7a, the intake system component 8a, or the fuel system component 9a.

With the configuration described above, at least one of the vent valve 41, the suction pump 42, or the pressure sensor 43 can be arranged in a compact space with respect to at least one of the frame 10, the storage box 20, the engine body 7a, the intake system component 8a, or the fuel system component 9a.

Thus, with the configuration described above, it is possible to obtain the vehicle 1 in which components for a leak test of a gas in the evaporative emission system 30 are arranged to easily avoid interference of the electric wire W and the gas passage connected to the components with other components.

Fourth Embodiment

<Configuration of Canister-Integrated-Leak-Detection Device of Forced-Negative-Pressure Type>

Figure 12:
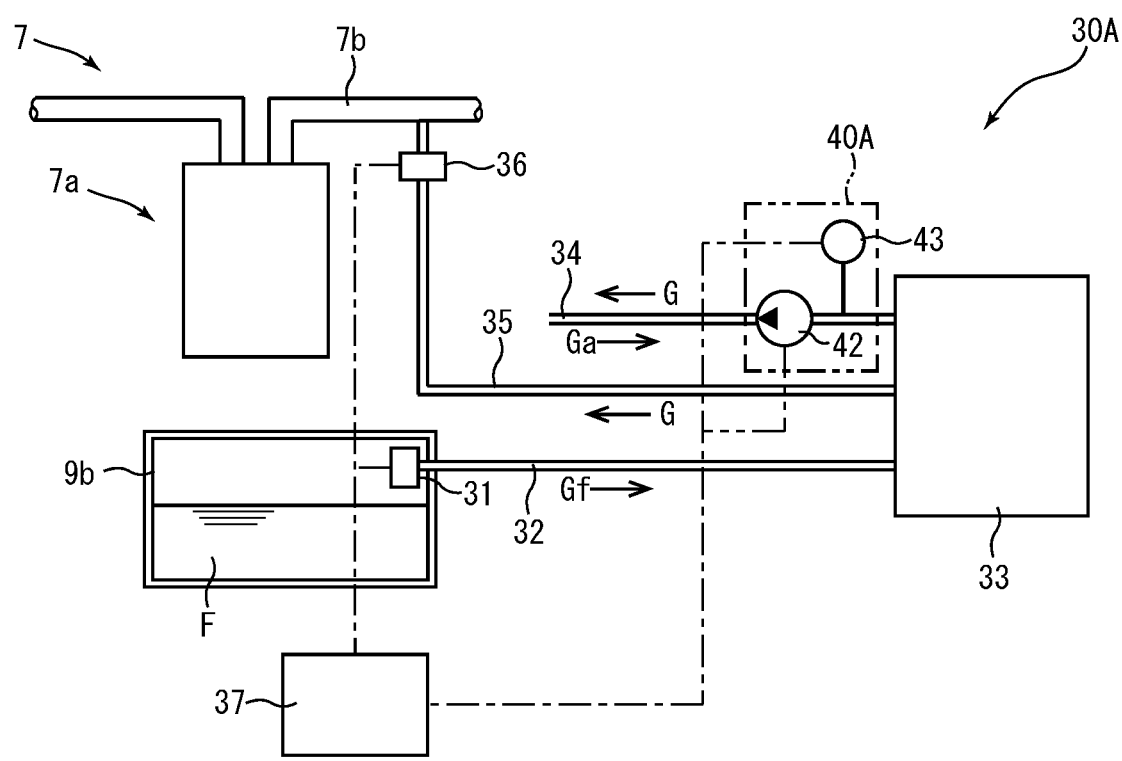
FIG. 12 is a schematic configuration view of an evaporative emission system according to a fourth embodiment of the present teaching.

Then, with reference to FIG. 12, description will be given on a leak detection device 40A included in an evaporative emission system 30A as a fourth embodiment of an evaporative emission system mounted on the vehicle 1 according to the present teaching. FIG. 12 is a schematic configuration view of the evaporative emission system 30A mounted on the vehicle 1 according to the embodiment. Note that in the following embodiment, specific description will be omitted for the same points as those in the embodiments described above, and different points will be mainly described.

As illustrated in FIG. 12, the evaporative emission system 30A includes the leak detection device 40A. The leak detection device 40A is a leak detection device of a forced-negative-pressure type that forcibly changes a pressure in a gas passage of the evaporative emission system 30A to a negative pressure by using a suction pump 42. The leak detection device 40A includes, as well as a canister 33, a suction pump 42 and a pressure sensor 43 that are components for a leak test of a gas G from the evaporative emission system 30A.

The suction pump 42 is disposed in a vent pipe 34. The suction pump 42 can suck the gas G in the gas passage through the vent pipe 34. While the suction pump 42 is stopped, the gas passage is in a state where outside air Ga that has passed through the suction pump 42 flows into the gas passage. While the suction pump 42 is operated, the gas G in the gas passage is discharged to the air by the suction pump 42, and thus, the gas passage is in a state where outside air Ga does not flow into the gas passage through the suction pump 42. Thus, the evaporative emission system 30A can introduce the outside air Ga into the gas passage including the canister 33 by stopping the suction pump 42. That is, the suction pump 42 can switch the vent pipe 34 between a closed state in which no outside air Ga flows into the canister 33 and an open state in which outside air Ga flows into the canister 33.

The suction pump 42 included in the leak detection device 40A is connected to a casing or a support member of the canister 33 by a suction-pump-connection member 42a. Alternatively, the suction pump 42 is connected while being in direct contact with the casing or the support member. At least a part of the suction pump 42 may be disposed in the casing. The suction pump 42 may be included in a part of the casing.

<Leak Detection of Evaporative Emission System>

In the case of detecting leakage of a gas G from the evaporative emission system 30A, a control device 37 switches a shut-off valve 31 and a purge control valve 36 to the closed state. Next, the control device 37 sucks the gas G in the gas passage by the suction pump 42 and discharges the gas G into the air from the vent pipe 34. At this time, no outside air Ga flows into the gas passage from the vent pipe 34. The control device 37 measures a pressure in the gas passage by the pressure sensor 43. If the measured value of the pressure sensor 43 is a reference value or more, the control device 37 determines that the gas G can leak from the gas passage.

The leak detection device 40A having the configuration of this embodiment can be disposed in a manner similar to those of the first through third embodiments. Accordingly, it is possible to obtain the vehicle in which components for a leak test of a gas in the evaporative emission system 30A are arranged to easily avoid interference of an electric wire W and the gas passage connected to the components with other components.

Fifth Embodiment

<Configuration of Canister-Integrated-Leak-Detection Device of Natural-Negative-Pressure Type>

Figure 13:
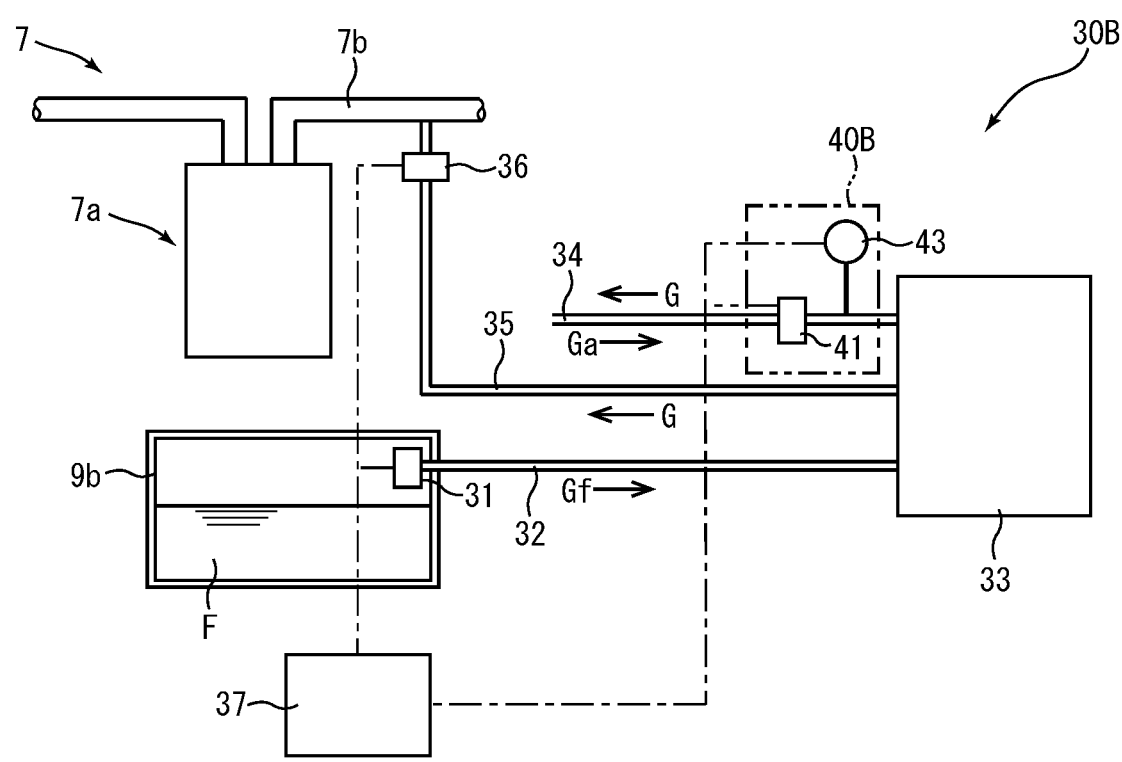
FIG. 13 is a schematic configuration view of an evaporative emission system according to a fifth embodiment of the present teaching.

Then, with reference to FIG. 13, description will be given on a leak detection device 40B included in an evaporative emission system 30B as a fifth embodiment of an evaporative emission system mounted on the vehicle 1 according to the present teaching. FIG. 13 is a schematic configuration view of the evaporative emission system 30B mounted on the vehicle 1 according to the embodiment.

As illustrated in FIG. 13, the evaporative emission system 30B includes the leak detection device 40B. The leak detection device 40B is a leak detection device of a natural-negative-pressure type that changes a pressure in a gas passage in the evaporative emission system 30B to a negative pressure by using thermal expansion and thermal contraction of a fuel evaporation gas Gf in a fuel tank 9b. The leak detection device 40B includes, as well as a canister 33, a vent valve 41 and a pressure sensor 43 that are components for a leak test of a gas G from the evaporative emission system 30B.

The vent valve 41 included in the leak detection device 40B is connected to a casing or a support member of the canister 33 by a vent-valve-connection member. Alternatively, the vent valve 41 is connected while being in direct contact with the casing or the support member. The vent valve 41 may be included in a part of the casing. At least a part of the vent valve 41 may be disposed in the casing.

<Leak Detection of Evaporative Emission System>

In the case of detecting leakage of a gas G from the evaporative emission system 30B, a control device 37 switches a shut-off valve 31 to an open state. In addition, the control device 37 switches the vent valve 41 and a purge control valve 36 to a closed state. Then, the control device 37 measures a pressure in the gas passage by the pressure sensor 43. In addition, the control device 37 measures a temperature in the fuel tank 9b with an unillustrated thermometer. The control device 37 determines whether there is a possibility of leakage of a gas G from the gas passage based on variations of temperature of the fuel tank 9b and variations of pressure in the gas passage.

The leak detection device 40B having the configuration of this embodiment can be disposed in a manner similar to those of the first through third embodiments. Accordingly, it is possible to obtain the vehicle in which components for a leak test of a gas in the evaporative emission system 30B are arranged to easily avoid interference of an electric wire W and the gas passage connected to the components with other components.

Other Embodiments

The embodiments of the present teaching have been described above, but the embodiments are merely examples for carrying out the present teaching. Thus, the present teaching is not limited to the embodiments, and the embodiments may be modified as necessary within a range not departing from the gist of the invention.

In the embodiments, the vehicle body 2 has a frame structure including the main frame 12 and the seat rail 13. Alternatively, the frame of the vehicle body 2 may have a stressed-skin structure.

In the embodiments, the frame 10 includes the head pipe 11, the main frame 12, and the seat rail 13. Alternatively, the frame 10 may include a frame other than the head pipe 11, the main frame 12, and the seat rail 13.

In the first embodiment, the suction pump 42 is switched by the vent valve 41 disposed in the vent pipe between a state in which the gas G in the gas passage can be sucked and a state in which the gas G cannot be sucked. Alternatively, in a case where the suction pump 42 includes a shut-off valve dedicated to the suction pump, the suction pump 42 only needs to be provided in any one of the first purge pipe 32, the canister 33, the vent pipe 34, or the second purge pipe 35.

In the first embodiment, the suction pump 42 is connected to the vent valve 41. Alternatively, the suction pump may be provided separately from the vent valve.

In the first embodiment, at least one of the frame 10, the storage box 20, the engine body 7a, the intake system component 8a, or the fuel system component 9a includes one internal space Ma. Alternatively, at least one of the frame, the storage box, the engine body, the intake system component, or the fuel system component may include a plurality of internal spaces. In this case, the pressure sensor, the vent valve, and the suction pump may be disposed in one of the plurality of internal spaces or may be separately disposed in the plurality of internal spaces. That is, a plurality of components of the leak detection device 40 may be disposed in one of the plurality of internal spaces, or one component of the leak detection device 40 may be disposed in one of the plurality of internal spaces. The plurality of internal spaces may include an internal space in which no components of the leak detection device 40 are disposed.

In the second embodiment, at least one of the frame 10, the storage box 20, the engine body 7a, the intake system component 8a, or the fuel system component 9a includes one recess Mb. Alternatively, at least one of the frame, the storage box, the engine body, the intake system component, or the fuel system component may include a plurality of recesses. In this case, the pressure sensor, the vent valve, and the suction pump may be disposed in one of the plurality of recesses or may be separately disposed in the plurality of recesses. That is, a plurality of components of the leak detection device 40 may be disposed in one of the plurality of recesses, or one component of the leak detection device 40 may be disposed in one of the plurality of recesses. The plurality of recesses may include a recess in which no components of the leak detection device 40 are disposed.

Figure 14:
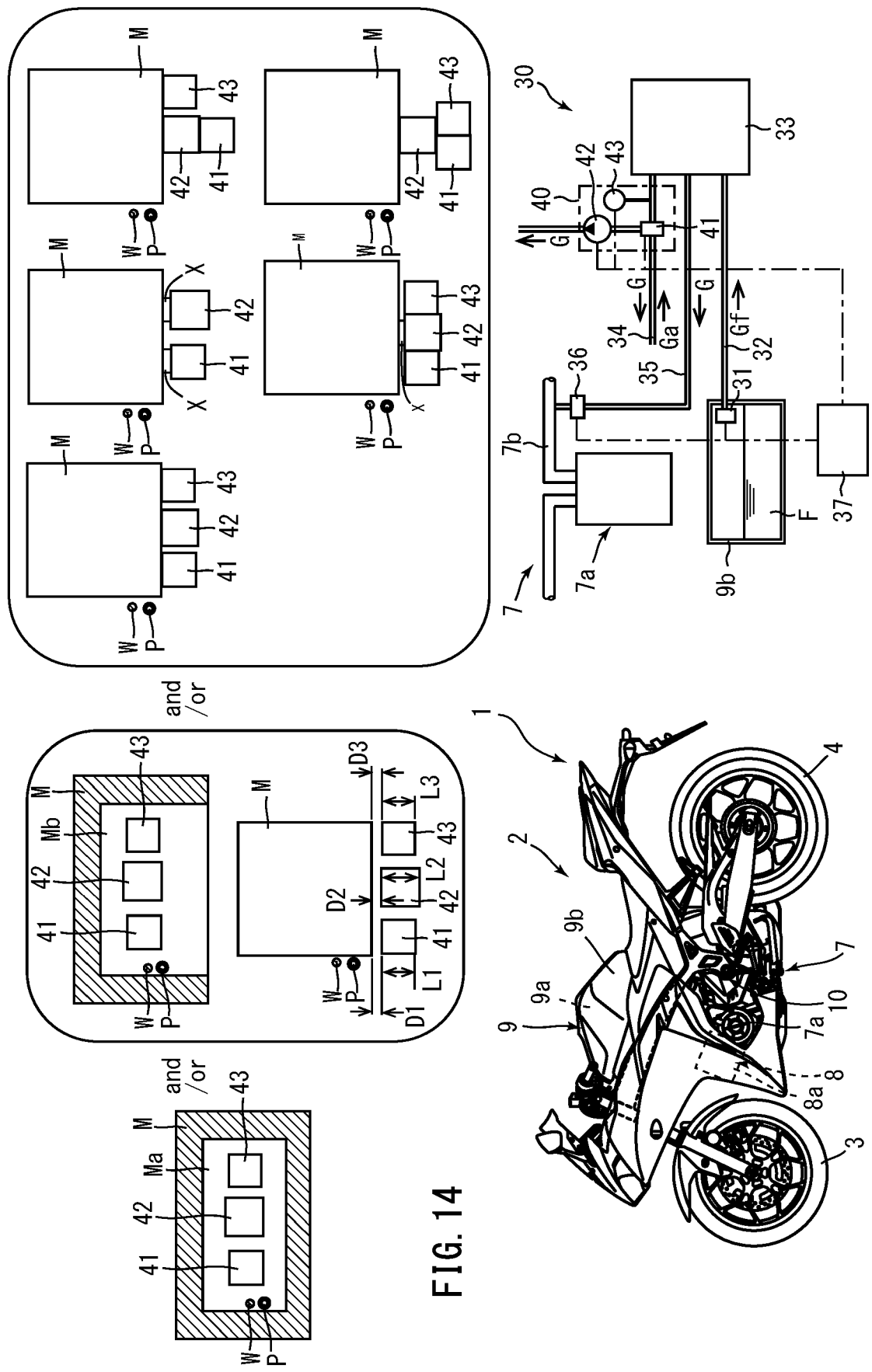
FIG. 14 is a view illustrating an example of layout of a leak detection device of an evaporative emission system according to first through third embodiments of the present teaching together with a schematic configuration of a vehicle and the evaporative emission system.

FIG. 14 illustrates an example of arrangement of components of the leak detection devices 40 according to the first through third embodiments. As illustrated in FIG. 14, the vent valve 41, the suction pump 42, and the pressure sensor 43 of the leak detection device 40 may be disposed as described in the example of the first through third embodiments. The example of arrangement of the leak detection device 40 in the first through third embodiments may be applied to the leak detection devices 40A and 40B having configurations as described in the fourth and fifth embodiments.

In the third embodiment, FIG. 10 illustrates the example in which at least one of the vent valve 41, the suction pump 42, or the pressure sensor 43 is disposed along the outer surface of the structure M. The case where at least one of the vent valve 41, the suction pump 42, or the pressure sensor 43 is disposed along the outer surface of the structure M includes a case where at least one of the vent valve 41, the suction pump 42, or the pressure sensor 43 is disposed obliquely to the outer surface of the structure or a case where least one of the vent valve 41, the suction pump 42, or the pressure sensor 43 is disposed along a curved surface or an uneven outer surface of the structure, for example.

Figure 11A:
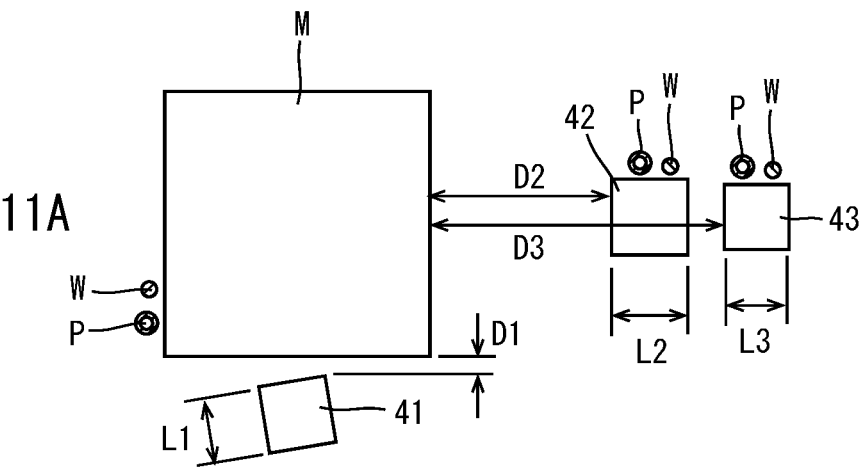
FIG. 11A is a view schematically illustrating an example of a state where at least one of the vent valve, the suction pump, or the pressure sensor is disposed along an outer surface of at least one of the frame, the storage box, the engine body, the intake system component, or the fuel system component.

For example, as illustrated in FIG. 11A, the vent valve 41 may be disposed obliquely to the outer surface of the structure M. The suction pump 42 or the pressure sensor 43 may be disposed obliquely to the outer surface of the structure M. Two or more of vent valve 41, the suction pump 42, or the pressure sensor 43 may be disposed obliquely to the outer surface of the structure M. The vent valve 41, the suction pump 42, and the pressure sensor 43 may be disposed obliquely to the outer surface of the structure M.

Figure 11B:
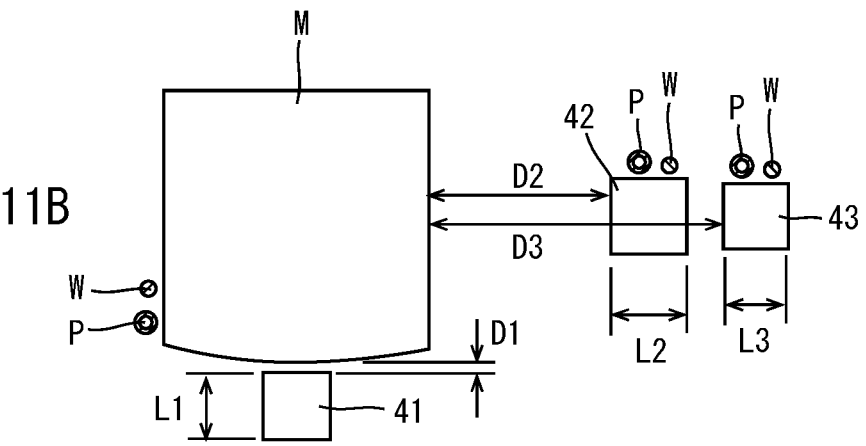
FIG. 11B is a view schematically illustrating an example of the state where at least one of the vent valve, the suction pump, or the pressure sensor is disposed along the outer surface of at least one of the frame, the storage box, the engine body, the intake system component, or the fuel system component.

For example, as illustrated in FIG. 11B, the vent valve 41 may be disposed along the curved outer surface of the structure M. The suction pump 42 or the pressure sensor 43 may be disposed along the curved outer surface of the structure M. Two or more of the vent valve 41, the suction pump 42, or the pressure sensor 43 may be disposed along the curved outer surface of the structure M. The vent valve 41, the suction pump 42, and the pressure sensor 43 may be disposed along the curved outer surface of the structure M.

Figure 11C:
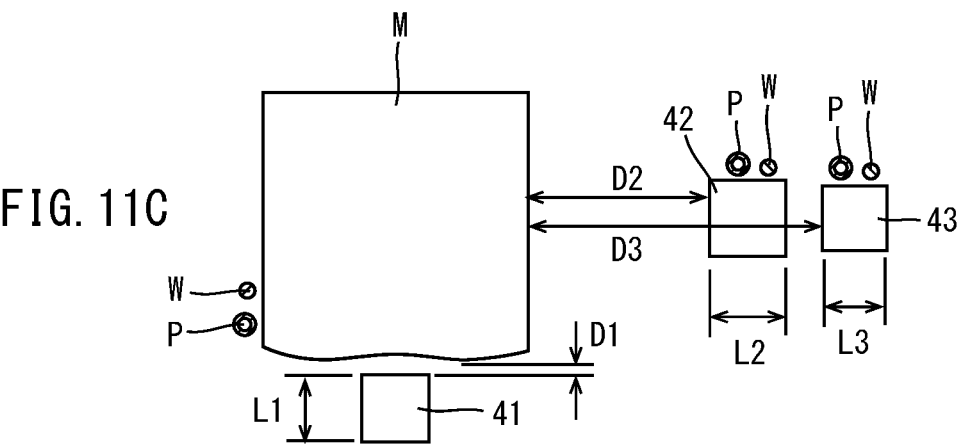
FIG. 11C is a view schematically illustrating an example of the state where at least one of the vent valve, the suction pump, or the pressure sensor is disposed along the outer surface of at least one of the frame, the storage box, the engine body, the intake system component, or the fuel system component.

For example, as illustrated in FIG. 11C, the vent valve 41 may be disposed along an uneven outer surface of the structure M. The suction pump 42 or the pressure sensor 43 may be disposed along the uneven outer surface of the structure M. Two or more of the vent valve 41, the suction pump 42, or the pressure sensor 43 may be disposed along the uneven outer surface of the structure M. The vent valve 41, the suction pump 42, and the pressure sensor 43 may be disposed along the uneven outer surface of the structure M.

As described above, the case where at least one of the vent valve 41, the suction pump 42, or the pressure sensor 43 is disposed along the outer surface of the structure M is not limited to a case where at least one of the vent valve 41, the suction pump 42, or the pressure sensor 43 is parallel to the outer surface of the outer surface of the structure M, and includes a case where the minimum distance D1 between the outer surface of the structure M and a component disposed along the outer surface of the structure M is smaller than the maximum dimension L1 of the component.

The case where at least one of the vent valve 41, the suction pump 42, or the pressure sensor 43 is disposed along the outer surface of the structure M may include a case where the minimum distance D1 between the outer surface of the structure M and a component disposed along the outer surface of the structure M is smaller than a maximum dimension of the structure M. That is, at least one of the vent valve 41, the suction pump 42, or the pressure sensor 43 only needs to be disposed near the structure M.

Figure 15:
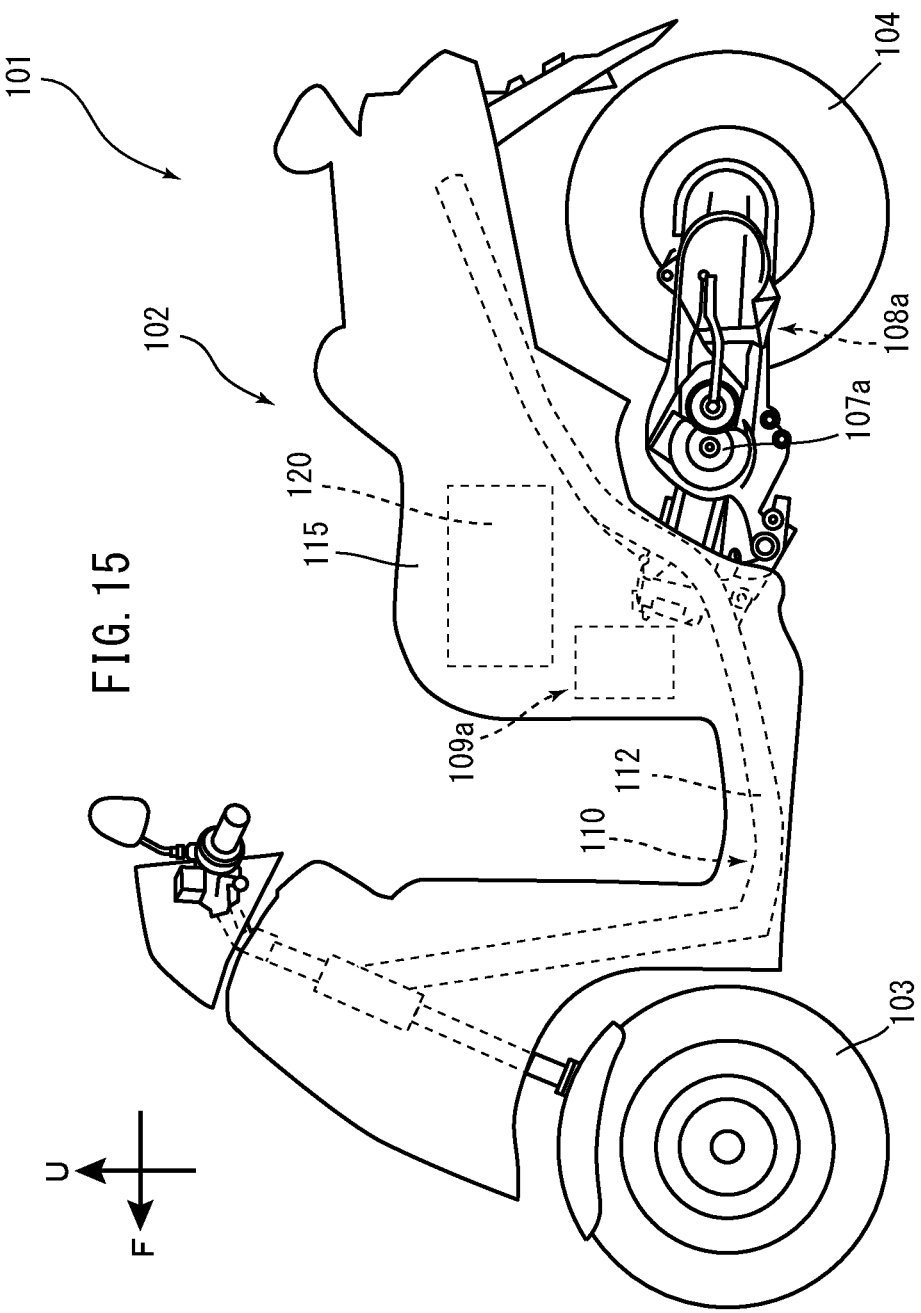
FIG. 15 is a view corresponding to FIG. 1 and illustrates an example of a vehicle according to another embodiment of the present teaching.

In the embodiments, the vehicle 1 is a straddled vehicle. The vehicle may be a vehicle 101 of a scooter type as illustrated in FIG. 15. As illustrated in FIG. 15, the vehicle 101 includes a vehicle body 102, a front wheel 103, and a rear wheel 104. In a manner similar to the vehicle 1, the vehicle 101 turns in a leaning posture. Specifically, the vehicle 101 leans leftward when turning to the left and leans rightward w % ben turning to the right. The vehicle 101 includes a frame 110 including a main frame 112, a storage box 120, an engine body 107a, an intake system component 108a, and a fuel system component 109a. When seen from above the vehicle 101, each of the frame 110, the storage box 120, the engine body 107a, the intake system component 108a, and the fuel system component 109a at least partially overlaps with a seat 115.

The vehicle 101 illustrated in FIG. 15 also includes the vent valve, the suction pump, and the pressure sensor in the leak detection device described in the embodiments. At least one of the vent valve, the suction pump, or the pressure sensor is supported by the frame 110, the storage box 120, the engine body 107a, the intake system component 108a, or the fuel system component 109a. At least one of the vent valve, the suction pump, or the pressure sensor may be disposed in an internal space or a recess of at least one of the frame 110, the storage box 120, the engine body 107a, the intake system component 108a, or the fuel system component 109a. At least one of the vent valve, the suction pump, or the pressure sensor may be disposed in the internal space or the recess of at least one of the frame 110, the storage box 120, the engine body 107a, the intake system component 108a, or the fuel system component 109a. At least one of the vent valve, the suction pump, or the pressure sensor may be disposed along the outer surface of at least one of the frame 110, the storage box 120, the engine body 107a, the intake system component 108a, or the fuel system component 109a. As described above, the vehicle 101 illustrated in FIG. 15 may include a leak detection device having a configuration similar to that of the leak detection device of each embodiment described above.

REFERENCE SIGNS LIST 1, 101 vehicle
2, 102 vehicle body
3, 103 front wheel
4, 104 rear wheel
5 vehicle body cover
6 bar handle
7 power unit
7a, 107a engine body
7b intake pipe
8 intake system
8a, 108a intake system component
9 fuel system
9a, 109a fuel system component
9b fuel tank
10, 110 frame
11 head pipe
12, 112 main frame
13 seat rail
15, 115 seat
20, 120 storage box
30, 30A, 30B evaporative emission system
31 shut-off valve
32 first purge pipe
33 canister
34 vent pipe
35 second purge pipe
36 purge control valve
37 control device
40, 40A, 40B leak detection device
41 vent valve
42 suction pump
43 pressure sensor
F fuel
Gf fuel evaporation gas
G gas
Ga outside air
M structure
Ma internal space
Mb recess
P pipe
W electric wire
X connection member

The invention claimed is:

1. A straddled vehicle comprising:
a frame;
a seat supported by the frame;
a storage box supported by the frame;
an engine having an engine body, at least a part of the engine body overlapping with the seat in a top view of the straddled vehicle, the engine having an intake passage;

an intake system configured to take air into the engine, the intake system including an intake system component;

a fuel system including a fuel tank, the fuel tank being configured to store fuel to be supplied to the engine, the fuel system further including a fuel system component;

an evaporative emission system having a canister and a gas passage that includes an outside-air-introduction passage, the evaporative emission system being configured
to collect a fuel evaporation gas generated in the fuel tank using the canister,
to introduce outside air into the canister from the outside-air-introduction passage, and
to discharge the collected fuel evaporation gas and the introduced outside air from the canister into the intake passage of the engine;

a pressure sensor configured to measure a pressure in the gas passage, in which a gas including at least one of the fuel evaporation gas or the outside air flows; and at least one of an electric vent valve or an electric suction pump, the electric vent valve being configured to switch between a closed state in which the outside-air-introduction passage is closed and an open state in which the outside-air-introduction passage is open, the electric suction pump being configured to suck the gas in the gas passage, wherein at least one of the pressure sensor, the vent valve, or the suction pump is supported by at least one of the frame, the storage box, the engine body, the intake system component, or the fuel system component.

2. The straddled vehicle according to claim 1, wherein said at least one of the pressure sensor, the vent valve, or the suction pump is either
disposed in an internal space of said at least one of the frame, the storage box, the engine body, the intake system component, or the fuel system component, or
disposed along an outer surface of said at least one of the frame, the storage box, the engine body, the intake system component, or the fuel system component.

3. The straddled vehicle according to claim 1, wherein said at least one of the pressure sensor, the vent valve, or the suction pump is either
connected to said at least one of the frame, the storage box, the engine body, the intake system component, or the fuel system component through a connection member, or
connected to, and in direct connect with, said at least one of the frame, the storage box, the engine body, the intake system component, or the fuel system component.

4. The straddled vehicle according to claim 1, wherein said at least one of the pressure sensor, the vent valve, or the suction pump is disposed in a recess constituted by an outer surface of said at least one of the frame, the storage box, the engine body, the intake system component, or the fuel system component.

* * * * *